(12) United States Patent
Nagasaka et al.

(10) Patent No.: US 9,074,902 B2
(45) Date of Patent: Jul. 7, 2015

(54) NAVIGATION APPARATUS AND MAP INFORMATION UPDATING METHOD

(75) Inventors: Hikaru Nagasaka, Okazaki (JP); Hiroyoshi Masuda, Nagoya (JP); Tetsuo Kumagai, Okazaki (JP); Tomoki Kodan, Nagoya (JP); Kazunori Watanabe, Okazaki (JP); Yasutaka Atarashi, Kariya (JP); Takayuki Watanabe, Kariya (JP)

(73) Assignees: AISIN AW CO., LTD., Aichi-ken (JP); TOYOTA JIDOSHA KABUSHIKI KAISHA, Aichi-ken (JP); DENSO CORPORATION, Aichi-ken (JP)

( * ) Notice: Subject to any disclaimer, the term of this patent is extended or adjusted under 35 U.S.C. 154(b) by 488 days.

(21) Appl. No.: 13/144,214

(22) PCT Filed: Feb. 9, 2010

(86) PCT No.: PCT/JP2010/052236
§ 371 (c)(1),
(2), (4) Date: Jul. 12, 2011

(87) PCT Pub. No.: WO2010/093044
PCT Pub. Date: Aug. 19, 2010

(65) Prior Publication Data
US 2011/0270798 A1    Nov. 3, 2011

(30) Foreign Application Priority Data

Feb. 13, 2009  (JP) ................................ 2009-031089
Feb. 1, 2010   (JP) ................................ 2010-020644

(51) Int. Cl.
*G06F 17/30* (2006.01)
*G01C 21/32* (2006.01)
*G09B 29/10* (2006.01)

(52) U.S. Cl.
CPC .............. *G01C 21/32* (2013.01); *G09B 29/106* (2013.01)

(58) Field of Classification Search
CPC .............. G01C 21/32; G06F 17/30241; G06F 3/04842; G06F 17/30156; G06F 17/30477; G06F 17/30554
USPC .................................... 701/208, 29, 201, 202
See application file for complete search history.

(56) References Cited

U.S. PATENT DOCUMENTS

2004/0002812 A1   1/2004  Yamanaka
2004/0117108 A1*  6/2004  Nemeth ........................ 701/200

(Continued)

FOREIGN PATENT DOCUMENTS

CN    101075386 A    11/2007
CN    101273246 A     9/2008

(Continued)

OTHER PUBLICATIONS

Otto, Hans-Ulrich et al., "Specification of actualisation strategies, map components version control and interface", 2003, ActMAP, pp. 1-123.*

(Continued)

*Primary Examiner* — Dinku Gebresenbet
(74) *Attorney, Agent, or Firm* — Sughrue Mion, PLLC

(57) ABSTRACT

When an update instruction to update "A" navigation map information and "B" navigation map information is inputted, a CPU initializes the storage area having stored therein no map information currently in use out of the two storage areas. The CPU then reads, from a CD-ROM, the latest version of the "A" navigation map information or the "B" navigation map information that corresponds to the map information currently in use, and stores it in the initialized storage area. The CPU then updates management information, starts use of the newly stored map information, initializes the storage area having stored therein the map information whose use is stopped out of the two storage areas, reads, from the CD-ROM, the latest version of the "A" navigation map information or the "B" navigation map information not currently in use, and stores it in the initialized storage area.

12 Claims, 14 Drawing Sheets

(56) References Cited

U.S. PATENT DOCUMENTS

| | | |
|---|---|---|
| 2004/0267441 A1* | 12/2004 | Kim .............................. 701/200 |
| 2005/0058155 A1* | 3/2005 | Mikuriya et al. ............. 370/474 |
| 2005/0203937 A1 | 9/2005 | Nomura |
| 2007/0266055 A1* | 11/2007 | Nomura ........................ 707/200 |
| 2008/0004800 A1 | 1/2008 | Arita et al. |
| 2009/0192706 A1 | 7/2009 | Nomura et al. |
| 2009/0216771 A1* | 8/2009 | Nakamura et al. .............. 707/10 |

FOREIGN PATENT DOCUMENTS

| | | |
|---|---|---|
| EP | 1108982 A2 | 6/2001 |
| EP | 1691169 A2 | 8/2006 |
| EP | 1736950 A1 | 12/2006 |
| JP | 2003-302225 A | 10/2003 |
| JP | 2003-337026 A | 11/2003 |
| WO | 2006/064605 A1 | 6/2006 |

OTHER PUBLICATIONS

Chinese Search Report, dated Jan. 20, 2014, issued in counterpart Chinese Patent Application No. 2010800045426.

* cited by examiner

NAVIGATION APPARATUS AND MAP INFORMATION UPDATING METHOD

TECHNICAL FIELD

The present invention relates to a navigation apparatus and a map information updating method.

BACKGROUND ART

Conventionally, various techniques for updating map information stored in a navigation apparatus have been developed.

One exemplary navigation apparatus disclosed in Japanese Patent Application Publication No. JP-A-2003-302225 is structured as follows. When any need to store new map data arises during operations, whether or not there are any free areas in a storage unit is detected. When the storage unit has no free areas, the map data stored in the storage unit is deleted based on the usage history information of the map data so as to create a free area. The new map data is then stored in the free area created in this manner.

However, with the navigation apparatus disclosed in Japanese Patent Application Publication No. JP-A-2003-302225, whenever no free areas are found in the storage unit, a free area is created so as to store therein the new map data. This invites an inevitable problem of an increase in file fragmentation of map data that reduces speeds in reading the map data.

DISCLOSURE OF THE INVENTION

In order to solve the problems described above, it is an object of the present invention to provide a navigation apparatus and a map information updating method that can avoid file fragmentation of update map information and the like, which may otherwise occur, when storing update map information.

In order to solve the problems described above, a navigation apparatus according to a first aspect is characterized by including: a map information storing unit that stores pieces of map information about a plurality of map coverage areas respectively in any of a plurality of storage areas including a first storage area and a second storage area, and that stores management information of the map coverage areas related to the pieces of map information stored in the storage areas; a map coverage area detecting unit that detects a map coverage area containing a piece of such map information currently in use out of the plurality of map coverage areas; a storage area selecting unit that selects the first storage area not having stored therein the piece of map information of the map coverage area detected by the map coverage area detecting unit, based on the management information; an update map information acquiring unit that acquires pieces of update map information of the map coverage areas from a recording medium having recorded thereon the pieces of update map information; and an update control unit that exerts control so as to initialize the first storage area, thereafter to acquire a piece of such update map information of the map coverage area detected by the map coverage area detecting unit through the update map information acquiring unit and to store it in the first storage area, and thereafter to update the management information, thereafter further to initialize the second storage area having stored therein map information of the map coverage area detected by the map coverage area detecting unit, thereafter to acquire a piece of such update map information of a map coverage area other than the piece of update map information stored in the first storage area through the update map information acquiring unit and to store it in the second storage area, and thereafter to update the management information.

The navigation apparatus according to a second aspect is characterized in that, in the navigation apparatus according to the first aspect, the pieces of the map information are separated into two map coverage areas having substantially equivalent information amounts.

A map information updating method according to a third aspect is characterized by including: detecting a map coverage area containing a piece of map information currently in use out of a plurality of map coverage areas; selecting a first storage area not having stored therein the piece of map information of the map coverage area detected in the detecting of the map coverage area out of a plurality of storage areas including the first storage area and a second storage area for storing therein pieces of such map information of the map coverage areas based on management information of the map coverage areas related to the pieces of map information stored in the storage areas; and exerting update control so as to initialize the first storage area selected in the selecting of the first storage area, thereafter to acquire a piece of update map information of the map coverage area detected in the detecting of the map coverage area from a recording medium having recorded thereon pieces of such update map information and to store it in the first storage area, and thereafter to update the management information, thereafter further to initialize the second storage area having stored therein map information of the map coverage area detected in the detecting of the map coverage area, thereafter to acquire a piece of such update map information of a map coverage area other than the piece of update map information stored in the first storage area from the recording medium and to store it in the second storage area, and thereafter to update the management information.

The map information updating method according to a fourth aspect is characterized in that, in the map information updating method according to the third aspect, the pieces of map information are separated into two map coverage areas having substantially equivalent information amounts.

A navigation apparatus according to a fifth aspect is characterized by including: a map information storing unit that stores a plurality of pieces of map information in any of a plurality of storage areas being more than the number of the plurality of pieces of map information, and that stores management information related to the pieces of map information stored in the storage areas; a free storage area selecting unit that selects one free storage area having stored therein none of the pieces of map information out of the plurality of storage areas, based on the management information; an initializing unit that initializes the free storage area selected by the free storage area selecting unit; a priority order storing unit that stores priority order previously given to the plurality of pieces of map information; a free storage area update control unit that exerts control so as to acquire a piece of update map information corresponding to a piece of such map information given first of the priority order from a recording medium having recorded thereon pieces of such update map information and to store it in the free storage area initialized by the initializing unit, and thereafter to update the management information; and a map information update control unit that exerts control so as to initialize the storage areas in turn according to the priority order from a storage area having stored therein the piece of map information given the first of the priority order based on the updated management information, to acquire pieces of such update map information that respectively correspond to pieces of such map information that are prioritized next highest to the pieces of the map information that had been stored in the initialized storage areas from the recording medium, and to store the acquired pieces of update map information respectively in the initialized storage areas so as to update the management information every time the acquired update map information is stored in the initialized storage areas, thereafter to initialize a storage area having stored therein a piece of such map information given the last of the priority order, and thereafter to update the management information.

The navigation apparatus according to a sixth aspect is characterized in that, in the navigation apparatus according to the fifth aspect, the plurality of pieces of map information are respectively about a plurality of map coverage areas, the navigation apparatus further including: a map coverage area detecting unit that detects a map coverage area containing a piece of such map information currently in use out of the plurality of map coverage areas; and a reprioritizing unit that reprioritizes to give the first of the priority order to the piece of map information of the map coverage area detected by the map coverage area detecting unit, and that reprioritizes the remaining pieces of such map information based on the priority order stored in the priority order storing unit, in which the free storage area update control unit and the map information update control unit exert control according to the priority order having been reprioritized by the reprioritizing unit.

The navigation apparatus according to a seventh aspect is characterized in that, in the navigation apparatus according to the sixth aspect, the plurality of map coverage areas are separated so that the plurality of pieces of map information have substantially equivalent information amounts.

The navigation apparatus according to an eighth aspect is characterized in that, in the navigation apparatus according to the fifth aspect, the plurality of pieces of map information are respectively about a plurality of types of data, and the plurality of types of data include road information related to a link and a node, audio/visual information related to route guidance, and search information for finding a route to a destination or for searching for a geographical point.

A map information updating method according to a ninth aspect is characterized by including: selecting, based on management information related to a plurality of pieces of map information having been respectively stored in a plurality of storage areas being more than the number of the pieces of map information, one free storage area having stored therein none of the pieces of map information out of the plurality of storage areas; initializing the free storage area selected in the selecting of the free storage area; exerting free storage area update control so as to acquire, from a recording medium having recorded thereon pieces of update map information and based on priority order previously given to the pieces of map information, a piece of such update map information corresponding to a piece of such map information given first of the priority order and to store it in the free storage area initialized in the initializing of the free storage area, and thereafter to update the management information; and exerting map information update control so as to initialize the storage areas in turn according to the priority order from a storage area having stored therein the piece of map information given the first of the priority order based on the management information updated in the exerting of the free storage area update control, to acquire pieces of such update map information that respectively correspond to pieces of such map information that are prioritized next highest to the pieces of the map information that had been stored in the initialized storage areas from the recording medium, and to store the acquired pieces of update map information respectively in the initialized storage areas so as to update the management information every time the acquired update map information is stored in the initialized storage areas, thereafter to initialize a storage area having stored therein a piece of such map information given the last of the priority order, and thereafter to update the management information.

With the navigation apparatus of the first aspect having the structure described above, after a first storage area having stored therein no map information currently in use is initialized, update map information of a map coverage area containing map information currently in use is stored in the initialized first storage area in its entirety. This avoids file fragmentation and the like of the map information, which may otherwise occur, when storing the update map information. Further, after the update map information of the map coverage area containing the map information currently in use is stored in the initialized first storage area, management information is updated. This makes it possible to store the update map information stored in the first storage area and to automatically switch to use the update map information during operations of the navigation apparatus.

Further, after switching to the update map information during operations of the navigation apparatus, a second storage area having stored therein the map information used until then is initialized so as to store update map information of the map coverage area other than the piece of update map information stored in the first storage area in the initialized second storage area. This surely avoids file fragmentation and the like of the map information, which may otherwise occur, when storing the update map information. Still further, after storing the update map information of the map coverage area other than the piece of update map information stored in the first storage area in the initialized second storage area, the management information is updated. This makes it possible to store the update map information of the map coverage area other than the piece of update map information stored in the first storage area and to use the update map information in the second storage area during operations of the navigation apparatus.

With the navigation apparatus of the second aspect, the pieces of map information are separated into two map coverage areas containing substantially equivalent amounts of information. In this manner, by providing two storage areas designed to have substantially equivalent storage capacities, it becomes possible to surely store pieces of update map information having been recorded on a recording medium in the storage areas in their entirety.

With the map information updating method of the third aspect, after a first storage area having stored therein no map information currently in use is initialized, update map information of a map coverage area containing map information currently in use is stored in the initialized first storage area in its entirety. This avoids file fragmentation and the like of the map information, which may otherwise occur, when storing the update map information. Further, after the update map information of the map coverage area containing the map information currently in use is stored in the initialized first storage area, management information is updated. This makes it possible to store the update map information stored in the first storage area and to automatically switch to use the update map information during operations of the navigation apparatus.

Further, after switching to the update map information during operations of the navigation apparatus, a second storage area having stored therein the map information used until then is initialized so as to store update map information of the map coverage area other than the piece of update map information stored in the first storage area in the initialized second storage area. This surely avoids file fragmentation and the like of the map information, which may otherwise occur, when storing the update map information. Still further, after storing the update map information of the map coverage area other than the piece of update map information stored in the first storage area in the initialized second storage area, the management information is updated. This makes it possible to store the update map information of the map coverage area other than the piece of update map information stored in the first storage area and to use the update map information in the second storage area during operations of the navigation apparatus.

With the map information updating method of the fourth aspect, the pieces of map information are separated into two map coverage areas having substantially equivalent information amounts. In this manner, by providing two storage areas designed to have substantially equivalent storage capacities, it becomes possible to surely store pieces of update map information having been recorded on a recording medium in the storage areas in their entirety.

With the navigation apparatus of the fifth aspect, after selecting one free storage area having stored therein no map information and initializing the selected free storage area, update map information corresponding to the map information given the first priority is stored in its entirety in the initialized free storage area. This avoids file fragmentation and the like of the map information, which may otherwise occur, when storing the update map information. Further, after storing the update map information in the initialized free storage area, management information is updated. This makes it possible to store the update map information and to automatically switch to place the update map information into use during operations of the navigation apparatus.

Further, during operations of the navigation apparatus, after the automatic switch to the update map information corresponding to the map information given the first priority, the storage areas are initialized in turn in order of priority, starting from the storage area having stored therein the map information given the first priority, based on the updated management information. The pieces of update map information respectively corresponding to the pieces of map information prioritized next highest to the pieces of map information that had been stored in the initialized storage areas are then stored in the initialized storage areas. This avoids file fragmentation and the like of the map information, which may otherwise occur, when storing the pieces of update map information.

Still further, every time the pieces of update map information, which are prioritized respectively next highest to the pieces of map information that had been stored in the initialized storage areas, are stored in the initialized storage areas, the management information is updated. This makes it possible to store the pieces of update map information in turn in order of priority, and to automatically switch to place the pieces of update map information into use in turn during operations of the navigation apparatus.

Still further, after the storage area having stored therein the map information that is given the lowest priority is initialized, the management information is updated. This makes it possible to surely select one free storage area having stored therein no map information, based on the management information. Still further, when storing of any update map information in the initialized free storage area or any initialized storage areas is aborted midway through the procedure, the storage area having stored therein the map information corresponding to the update map information is not initialized and the management information remains. Accordingly, the navigation apparatus can use the entire pieces of map information based on the management information.

With the navigation apparatus of the sixth aspect, the pieces of the map information are about a plurality of map coverage areas. This makes it possible to update the update map information for each of the map coverage areas and to automatically switch to place the pieces of update map information into use during operations of the navigation apparatus. Further, after storing the update map information of the map coverage area containing the map information currently in use in the initialized free storage area, the management information is updated. This makes it possible to store firstly the update map information of the map coverage area containing the map information currently in use, and to automatically switch to place the update map information into use during operations of the navigation apparatus.

Still further, when storing of any update map information in the initialized free storage area or any initialized storage areas is aborted midway through the procedure, the storage area having stored therein the map information of the map coverage area corresponding to the update map information is not initialized and the management information remains. Accordingly, the navigation apparatus can use the map information about the all coverage areas based on the management information.

With the navigation apparatus of the seventh aspect, the map coverage areas are separated so that the pieces of map information have substantially equivalent information amounts. In this manner, by providing a plurality of storage areas designed to have substantially equivalent storage capacities, it becomes possible to surely store pieces of update map information having been recorded on a recording medium in the storage areas in their entirety.

With the navigation apparatus of the eighth aspect, the pieces of map information are a plurality of types of data including road information related to links and nodes, audio/visual information related to route guidance, and search information for finding a route to a destination or for searching for a geographical point. This makes it possible to update the update map information for each of the types of data and to automatically switch to place the pieces of update map information into use during operations of the navigation apparatus.

Further, when storing of any update map information in the initialized free storage area or any initialized storage areas is aborted midway through the procedure, the storage area having stored therein the map information of the data type corresponding to the update map information is not initialized and the management information remains. Accordingly, the navigation apparatus can use the entire data types of map information.

With the map information updating method of the ninth aspect, after selecting one free storage area having stored therein no map information and initializing the selected free storage area, update map information corresponding to the map information given the first priority is stored in its entirety in the initialized free storage area. This avoids file fragmentation and the like of the map information, which may otherwise occur, when storing the update map information. Further, after storing the update map information in the initialized free storage area, management information is updated. This makes it possible to store the update map information and to automatically switch to place the update map information into use during operations of the navigation apparatus.

Further, during operations of the navigation apparatus, after the automatic switch to the update map information corresponding to the map information given the first priority, the storage areas are initialized in turn in order of priority, starting from the storage area having stored therein the map information given the first priority, based on the updated management information. The pieces of update map information respectively corresponding to the pieces of map information prioritized next highest to the pieces of map information that had been stored in the initialized storage areas are then stored in the initialized storage areas. This avoids file fragmentation and the like of the map information, which may otherwise occur, when storing the pieces of update map information.

Still further, every time the pieces of update map information, which are prioritized next highest to the pieces of map information that had been stored in the initialized storage areas, are stored in the initialized storage areas, the management information is updated. This makes it possible to store the pieces of update map information in turn in order of priority, and to automatically switch to place the pieces of update map information into use in turn during operations of the navigation apparatus.

Still further, after the storage area having stored therein the map information that is given the lowest priority is initialized, the management information is updated. This makes it possible to surely select one free storage area having stored therein no map information, based on the management information. Still further, when storing of any update map information in the initialized free storage area or any initialized storage areas is aborted midway through the procedure, the storage area having stored therein the map information corresponding to the update map information is not initialized and the management information remains. Accordingly, the navigation apparatus can use the entire pieces of map information.

BEST MODES FOR CARRYING OUT THE INVENTION

Hereafter, a navigation apparatus and a map information updating method according to the present invention will be described in detail based on their first to third embodiments with reference to accompanying drawings.

First Embodiment

Schematic Structure of Navigation Apparatus

Figure 1:
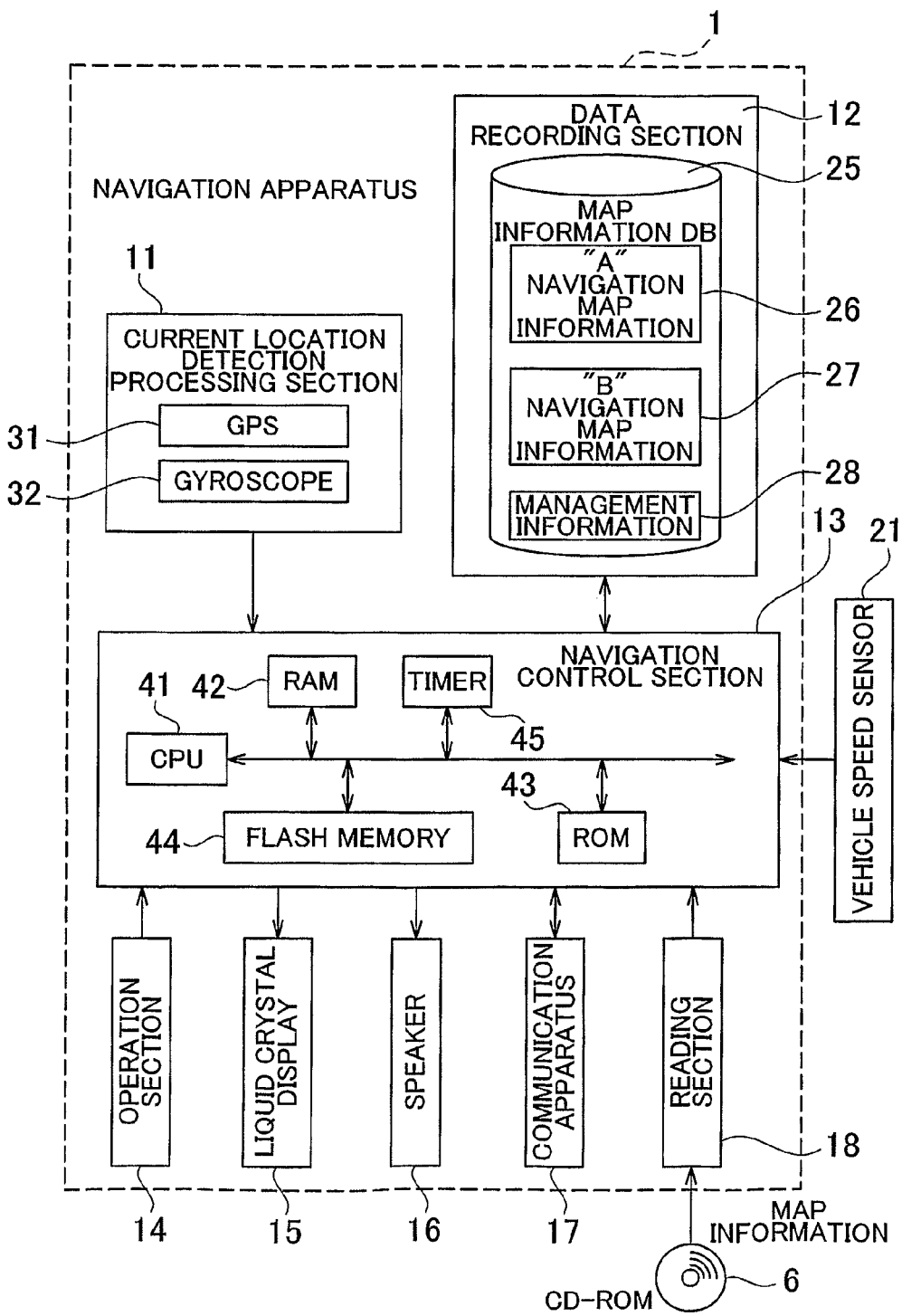
FIG. 1 is a block diagram showing a navigation apparatus according to a first embodiment.

First, a description will be given of a schematic structure of a navigation apparatus according to a first embodiment referring to FIGS. 1 and 2. FIG. 1 is a block diagram showing a navigation apparatus 1 according to the first embodiment.

As shown in FIG. 1, the navigation apparatus 1 of the first embodiment is structured with a current location detection processing section 11 detecting the current location of a host vehicle, a data recording section 12 having various data recorded therein, a navigation control section 13 carrying out various computing processing based on any received information, an operation section 14 for a user to manipulate, a liquid crystal display 15 displaying information such as maps for the user, a speaker 16 providing voice guidance related to route guidance and the like, a communication apparatus 17 establishing communication with a road traffic information center, a map information distribution center or the like (not shown) over a mobile telephone network or the like, and a reading section 18 reading map information of a prescribed version recorded on an administrative district basis (for example, on a prefectural, state, or national basis) from a CD-ROM 6 that serves as a recording medium. A vehicle speed sensor 21 detecting the traveling speed of the host vehicle is connected to the navigation control section 13.

Here, the CD-ROM 6 has stored therein broad area map information, such as a nationwide map of Japan or the United States, or a West European map, of the latest version, for use in drive guidance or route finding with the navigation apparatus 1. The broad area map information is structured with "A" navigation map information 26 and "B" navigation map information 27, which are separated along the boundary between administrative districts (for example, along a prefectural, state, or national boundary) so as to be two map coverage areas containing substantially equivalent amounts of information, i.e., data amounts, and have been stored in the CD-ROM 6.

The navigation map information 26 and 27 are structured with various types of information required for providing route guidance and displaying any map, e.g., new road information for specifying newly constructed roads, map display data for displaying any map, intersection data related to intersections, node data related to nodes, link data related to roads (links), finding data for finding routes, store data as to POI (Point of Interest), such as stores, i.e., one type of facilities, search data for searching for geographical points, and the like.

Particularly as to the map display data, it is structured with units obtained from a two dimensional mesh partitioned into approximately 10 km by 10 km base blocks each further being divided into quarters (length ½), sixteenths (¼), or sixty-fourths (⅛). The divided units are allotted for respective areas so as to have substantially equivalent data amounts. The smallest unit, i.e., the one sixty-fourth sized unit, is about 1.25 kilometers square.

In the following, a description will be given of the constituents of the navigation apparatus 1. The current location detection processing section 11 is constituted of a GPS 31, a gyroscope 32 and the like, and capable of detecting the current location of the host vehicle, direction of the host vehicle and the like.

The data recording section 12 includes a hard disk (not shown) serving as an external storage device and a recording medium, and a read-write head (not shown) serving as a drive for reading a map information database (map information DB) 25, prescribed programs and the like stored in the hard disk, and for writing prescribed data into the hard disk.

Figure 2:
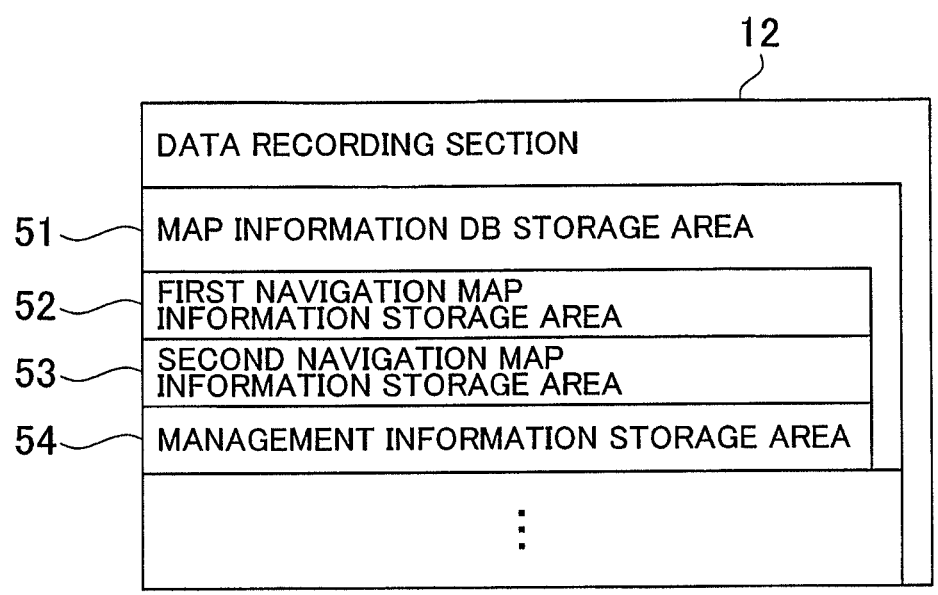
FIG. 2 is a block diagram showing the schematic structure of a data recording section.

As shown in FIG. 2, the data recording section 12 is provided with areas such as a map information DB storage area 51 where the map information DB 25 is stored. The map information DB storage area 51 is provided with a first navigation map information storage area 52, a second navigation map information storage area 53, a management information storage area 54, and the like. The first navigation map information storage area 52 and the second navigation map information storage area 53 are designed to have substantially equivalent storage capacities, each being large enough to store the entire data of one of the "A" navigation map information 26 and the "B" navigation map information 27 read from the CD-ROM 6.

As will be described later, one of the "A" navigation map information 26 and the "B" navigation map information 27 of the latest version read from the CD-ROM 6 via the reading section 18 is then stored in the first navigation map information storage area 52, whereas the other one of the "A" navigation map information 26 and the "B" navigation map information 27 of the latest version is stored in the second navigation map information storage area 53 (see FIG. 3). Management information 28 related to the navigation map information 26 and 27 (for example, storage areas having stored therein the navigation map information 26 and 27, map coverage areas, versions, dates of update, and the like of the navigation map information 26 and 27) has been stored in the management information storage area 54.

Accordingly, the contents of the map information DB 25 is updated by downloading update information, such as differential data distributed from the map information distribution center (not shown) via the communication apparatus 17 and any broad area map information of the latest version recorded on the CD-ROM 6.

Further, as shown in FIG. 1, the navigation control section 13 being a constituent of the navigation apparatus 1 includes: a CPU 41 serving as a computing unit and a controller for exerting control over the entire navigation apparatus 1; internal storage devices such as RAM 42 being used as working memory when the CPU 41 executes various computing processing and also storing route data and the like in finding a route, ROM 43 having stored therein control programs, a "map information updating process 1" program for updating the contents of the map information DB 25, which will be described later (see FIG. 3) and the like, and flash memory 44 storing any program read from the ROM 43, user setting, learned contents and the like; a timer 45 counting time, and the like.

Still further, peripheral devices (actuators), i.e., the operation section 14, the liquid crystal display 15, the speaker 16, the communication apparatus 17, and the reading section 18, are electrically connected to the navigation control section 13.

The operation section 14 is operated when correcting the current location at the start of traveling, and inputting a departure point as a guidance starting geographical point and a destination as a guidance ending geographical point, when searching for information related to facilities, or in other situations, and is structured with various keys and a plurality of operational switches. Based on a switch signal put out in accordance with the state of any switch being pressed or the like, the navigation control section 13 exerts control so as to execute the corresponding operation. The liquid crystal display 15 is structured to have a touch screen on its front side, so that various instruction commands can be inputted upon pressing any button or map displayed on the screen.

The liquid crystal display 15 displays map information corresponding to current traveling, an operation guidance, an operation menu, a key guidance, a recommended route from the current location to the destination, guidance information for traveling along the recommended route, traffic information, news, weather forecast, the time, mail, television programs, and the like.

Based on an instruction from the navigation control section 13, the speaker 16 provides voice guidance or the like for traveling along the recommended route. An example of the voice guidance provided may be "turn right at xx intersection in 200 meters".

The communication apparatus 17 is a tuner receiving information from a communication unit establishing communication with the map information distribution center over the mobile telephone network or the like, or from a radio station distributing map information. Thus, the communication apparatus 17 carries out transmission or reception of update map information of the latest version and the like to or from the map information distribution center. In addition to the information from the map information distribution center, the communication apparatus 17 receives traffic information that includes various types of information, such as traffic congestion information and the service area congestion transmitted from any road traffic information center, radio station or the like.

The reading section 18 reads map information of the latest version recorded on the installed CD-ROM 6. The reading section 18 is structured to be capable of reading music data, visual data, map data and the like recorded on any CD, DVD, DVD-ROM and the like.

[Map Information Updating Process 1]

Next, a description will be given of the "map information updating process 1" that is a process executed by the CPU 41 of the navigation apparatus 1 structured as described above so as to update navigation map information to the latest version while using the "A" navigation map information 26 or the "B" navigation map information 27, referring to FIGS. 3 to 8.

Figure 3:
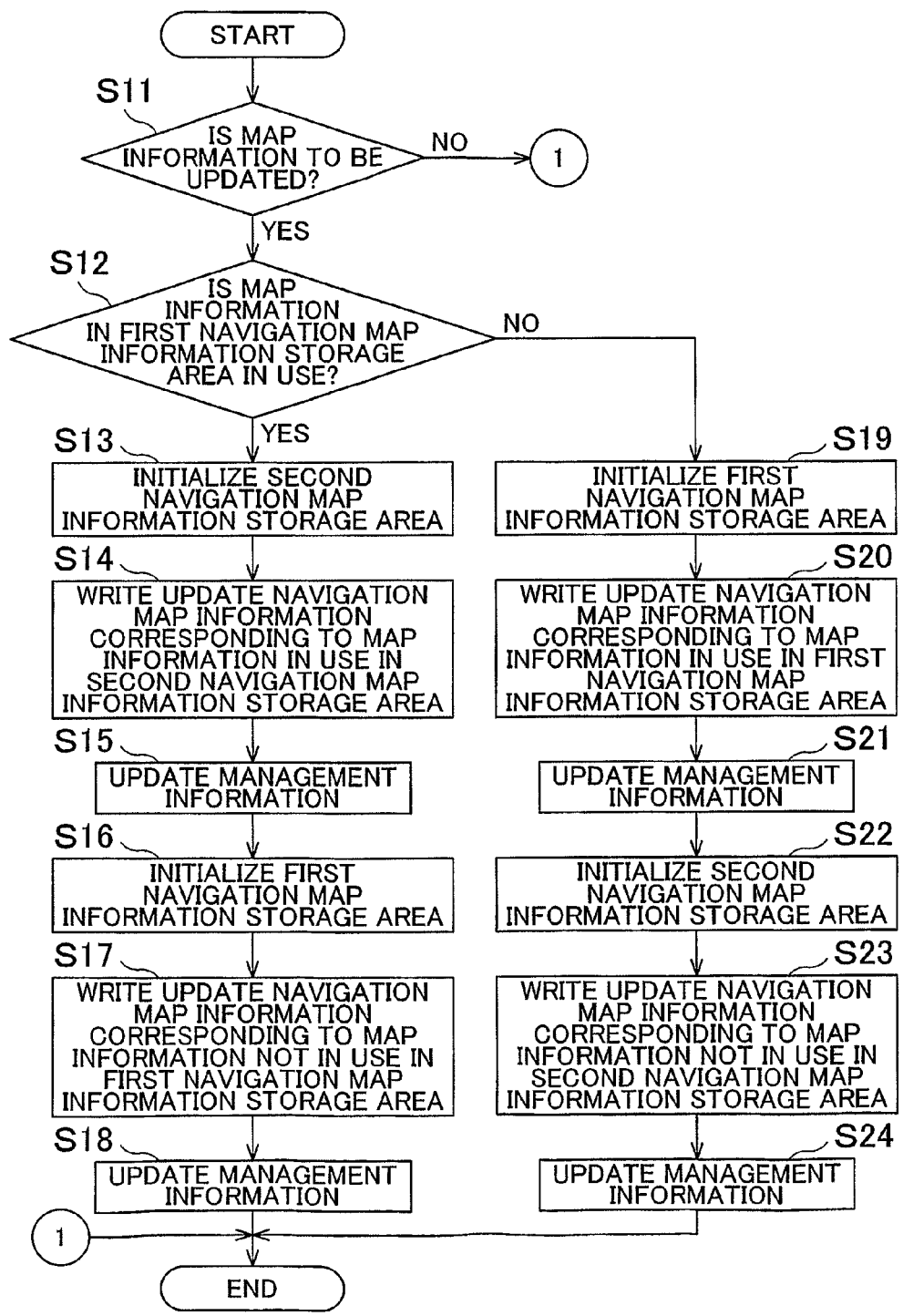
FIG. 3 is a flowchart showing a "map information updating process 1" that is a process executed by the CPU of the navigation apparatus so as to update navigation map information to the latest version while using "A" navigation map information or "B" navigation map information.

FIG. 3 is a flowchart showing the "map information updating process 1" that is a process executed by the CPU 41 of the navigation apparatus 1 of the first embodiment so as to update navigation map information to the latest version while using the "A" navigation map information 26 or the "B" navigation map information 27.

The program shown in the flowchart of FIG. 3 has been stored in the ROM 43 included in the navigation control section 13 of the navigation apparatus 1, and is executed by the CPU 41 at prescribed time intervals (for example, at about every 10 to 100 milliseconds).

As shown in FIG. 3, first, in step (hereafter abbreviated as S) 11, the CPU 41 reads map information of the latest version from the CD-ROM 6 installed in the reading section 18, in accordance with any input operation or the like of the operation section 14, such as the touch screen and the operational switch so as to execute a determination processing of determining whether or not an update instruction to update the navigation map information 26 and 27 stored in the map information DB 25 is inputted.

When the update instruction to update the navigation map information 26 and 27 stored in the map information DB 25 is not inputted (S11: NO), the CPU 41 ends the map information updating process 1.

On the other hand, when the update instruction to update the navigation map information 26 and 27 stored in the map information DB 25 is inputted (S11: YES), the CPU 41 proceeds to S12.

Next, in S12, the CPU 41 executes a determination processing of determining whether or not map information stored in the first navigation map information storage area 52 is in use. Specifically, the CPU 41 detects the current location of the host vehicle (hereafter referred to as "the host vehicle location") based on the detection result of the current location detection processing section 11. Based on the management information 28, the CPU 41 then executes a determination processing of determining whether or not the coordinates (e.g., latitude and longitude) of the host vehicle location fall within a map coverage area of the map information stored in the first navigation map information storage area 52.

When the map information stored in the first navigation map information storage area 52 is in use (S12: YES), the CPU 41 proceeds to S13. In S13, the CPU 41 initializes the second navigation map information storage area 53.

Subsequently, in S14, the CPU 41 refers to the management information 28 to determine whether the map information stored in the first navigation map information storage area 52 is the "A" navigation map information 26 or the "B" navigation map information 27. When the map information stored in the first navigation map information storage area 52 is the "A" navigation map information 26, the CPU 41 reads, from the CD-ROM 6, the "A" navigation map information 26 of the latest version and stores it in the initialized second navigation map information storage area 53. On the other hand, when the map information stored in the first navigation map information storage area 52 is the "B" navigation map information 27, the CPU 41 reads, from the CD-ROM 6, the "B" navigation map information 27 of the latest version and stores it in the initialized second navigation map information storage area 53.

In S15, the CPU 41 updates the management information 28 in relation to the second navigation map information storage area 53. Specifically, the CPU 41 stores which one of the "A" navigation map information 26 and the "B" navigation map information 27 the map information just stored in the second navigation map information storage area 53 corresponds to, and additionally, stores the map coverage area, version, date of update, and the like of the map information just stored in the second navigation map information storage area 53, in the management information storage area 54 as the management information 28.

The CPU 41 also stops use of the map information stored in the first navigation map information storage area 52, and starts use of the map information just stored in the second navigation map information storage area 53. This enables the CPU 41 to use the map information of the latest version so as to display the surrounding map in connection with the host vehicle location, to perform route finding, and the like.

Subsequently, in S16, the CPU 41 initializes the first navigation map information storage area 52.

In S17, the CPU 41 refers to the management information 28 to determine whether the map information stored in the second navigation map information storage area 53 is the "A" navigation map information 26 or the "B" navigation map information 27. When the map information stored in the second navigation map information storage area 53 is the "A" navigation map information 26, the CPU 41 reads, from the CD-ROM 6, the "B" navigation map information 27 of the latest version and stores it in the initialized first navigation map information storage area 52. On the other hand, when the map information stored in the second navigation map information storage area 53 is the "B" navigation map information 27, the CPU 41 reads, from the CD-ROM 6, the "A" navigation map information 26 of the latest version and stores it in the initialized first navigation map information storage area 52.

In S18, the CPU 41 updates the management information 28 in relation to the first navigation map information storage area 52, and then ends the map information updating process 1. Specifically, the CPU 41 stores which one of the "A" navigation map information 26 and the "B" navigation map information 27 the map information just stored in the first navigation map information storage area 52 corresponds to, and additionally, stores the map coverage area, version, date of update, and the like of the map information just stored in the first navigation map information storage area 52, in the management information storage area 54 as the management information 28. Subsequently, the CPU 41 ends the map information updating process 1.

On the other hand, in S12, when the map information stored in the first navigation map information storage area 52 is not in use, that is, when map information stored in the second navigation map information storage area 53 is in use (S12: NO), the CPU 41 proceeds to S19. In S19, the CPU 41 initializes the first navigation map information storage area 52.

Subsequently, in S20, the CPU 41 refers to the management information 28 to determine whether the map information stored in the second navigation map information storage area 53 is the "A" navigation map information 26 or the "B" navigation map information 27. When the map information stored in the second navigation map information storage area 53 is the "A" navigation map information 26, the CPU 41 reads, from the CD-ROM 6, the "A" navigation map information 26 of the latest version and stores it in the initialized first navigation map information storage area 52. On the other hand, when the map information stored in the second navigation map information storage area 53 is the "B" navigation map information 27, the CPU 41 reads, from the CD-ROM 6, the "B" navigation map information 27 of the latest version and stores it in the initialized first navigation map information storage area 52.

In S21, the CPU 41 updates the management information 28 in relation to the first navigation map information storage area 52. Specifically, the CPU 41 stores which one of the "A" navigation map information 26 and the "B" navigation map information 27 the map information just stored in the first navigation map information storage area 52 corresponds to, and additionally, stores the map coverage area, version, date of update, and the like of the map information just stored in the first navigation map information storage area 52, in the management information storage area 54 as the management information 28.

The CPU 41 also stops use of the map information stored in the second navigation map information storage area 53, and starts use of the map information just stored in the first navigation map information storage area 52. This enables the CPU 41 to use the map information of the latest version so as to display the surrounding map in connection with the host vehicle location, to perform route finding, and the like.

Subsequently, in S22, the CPU 41 initializes the second navigation map information storage area 53.

In S23, the CPU 41 refers to the management information 28 to determine whether the map information stored in the first navigation map information storage area 52 is the "A" navigation map information 26 or the "B" navigation map information 27. When the map information stored in the first navigation map information storage area 52 is the "A" navigation map information 26, the CPU 41 reads, from the CD-ROM 6, the "B" navigation map information 27 of the latest version and stores it in the initialized second navigation map information storage area 53. On the other hand, when the map information stored in the first navigation map information storage area 52 is the "B" navigation map information 27, the CPU 41 reads, from the CD-ROM 6, the "A" navigation map information 26 of the latest version and stores it in the initialized second navigation map information storage area 53.

In S24, the CPU 41 updates the management information 28 in relation to the second navigation map information storage area 53, and then ends the map information updating process 1. Specifically, the CPU 41 stores which one of the "A" navigation map information 26 and the "B" navigation map information 27 the map information just stored in the second navigation map information storage area 53 corresponds to, and additionally, stores the map coverage area, version, date of update, and the like of the map information just stored in the second navigation map information storage area 53, in the management information storage area 54 as the management information 28. Subsequently, the CPU 41 ends the map information updating process 1.

Here, referring to FIGS. 4 to 8, a description will be given of an exemplary case of updating the map information where the CPU 41 receives an update instruction to update the navigation map information 26 and 27 while the "A" navigation map information 26 stored in the first navigation map information storage area 52 is in use. In this exemplary case, the "A" navigation map information 26 is map information of a map coverage area of substantially western half of the United States. The "B" navigation map information 27 is map information of a map coverage area of substantially eastern half of the United States. The boundary between the "A" navigation map information 26 and the "B" navigation map information 27 is set so as to separate them into substantially two eastern and western halves along the state lines.

Figure 4:
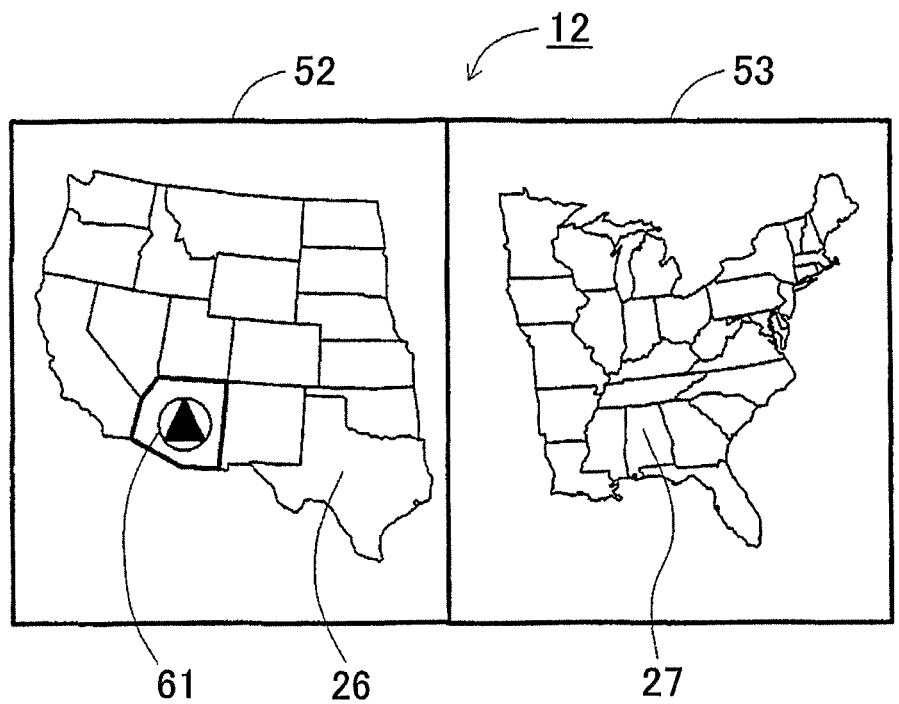
FIG. 4 schematically shows exemplary navigation map information stored in navigation map information storage areas before update.

First, as shown in FIG. 4, the first navigation map information storage area 52 has stored therein the "A" navigation map information 26 being the map coverage area of substantially western half of the United States, whereas the second navigation map information storage area 53 has stored therein the "B" navigation map information 27 being the map coverage area of substantially eastern half of the United States. The management information storage area 54 has stored therein as the management information 28 that the "A" navigation map information 26 has been stored in the first navigation map information storage area 52 and that the "B" navigation map information 27 has been stored in the second navigation map information storage area 53.

When an update instruction to update the navigation map information 26 and 27 is inputted, the CPU 41 detects the host vehicle location based on the detection result of the current location detection processing section 11. The CPU 41 then determines that, as indicated by a vehicle location mark 61, the host vehicle location is at Phoenix, Ariz., on the "A" navigation map information 26 stored in the first navigation map information storage area 52. In other words, the CPU 41 determines that the "A" navigation map information 26 stored in the first navigation map information storage area 52 is currently in use (S11: YES and S12: YES).

Figure 5:
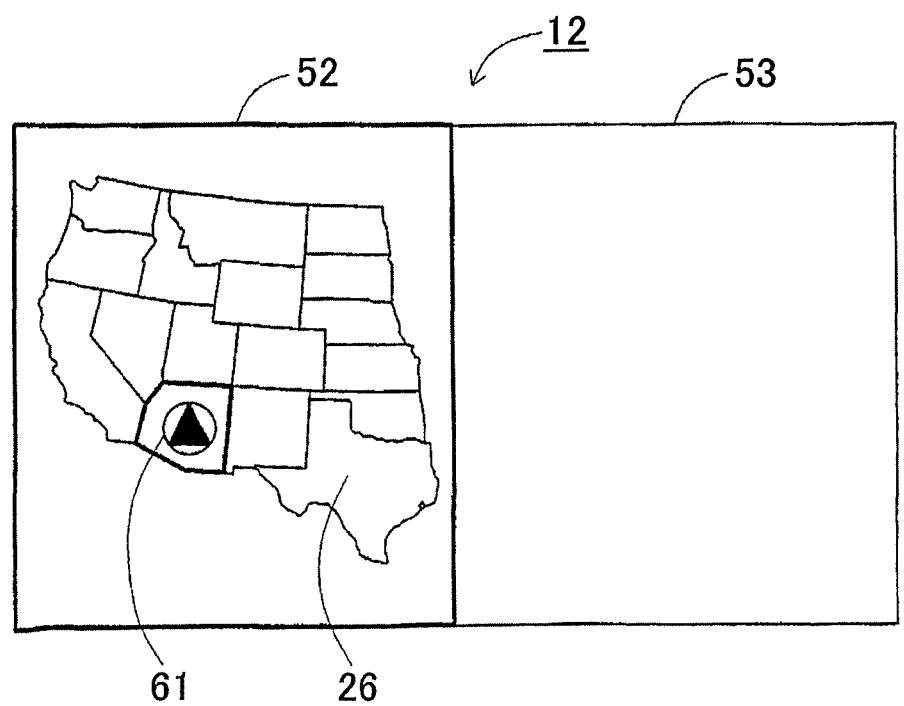
FIG. 5 schematically shows a state where a second navigation map information storage area is initialized.

As shown in FIG. 5, the CPU 41 then initializes the second navigation map information storage area 53 (S13).

Figure 6:
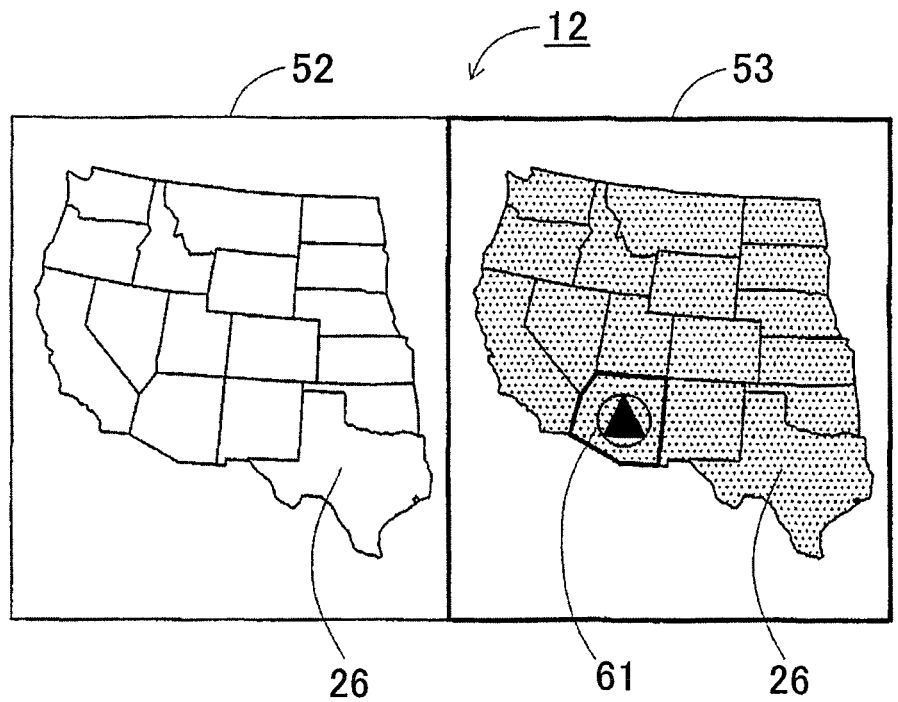
FIG. 6 schematically shows a state where the navigation map information for use is switched to "A" navigation map information of the latest version just stored in the second navigation map information storage area.

As shown in FIG. 6, the CPU 41 then reads, from the CD-ROM 6, the "A" navigation map information 26 of the latest version and stores it in the initialized second navigation map information storage area 53. The CPU 41 then stores data indicating that the map information just stored in the second navigation map information storage area 53 is the "A" navigation map information 26, as well as the map coverage area, version, date of update and the like of the "A" navigation map information 26, in the management information storage area 54 as the management information 28. As indicated by the vehicle location mark 61, the CPU 41 stops use of the "A" navigation map information 26 stored in the first navigation map information storage area 52 and starts use of the "A" navigation map information 26 of the latest version just stored in the second navigation map information storage area 53 (S14 and S15).

Figure 7:
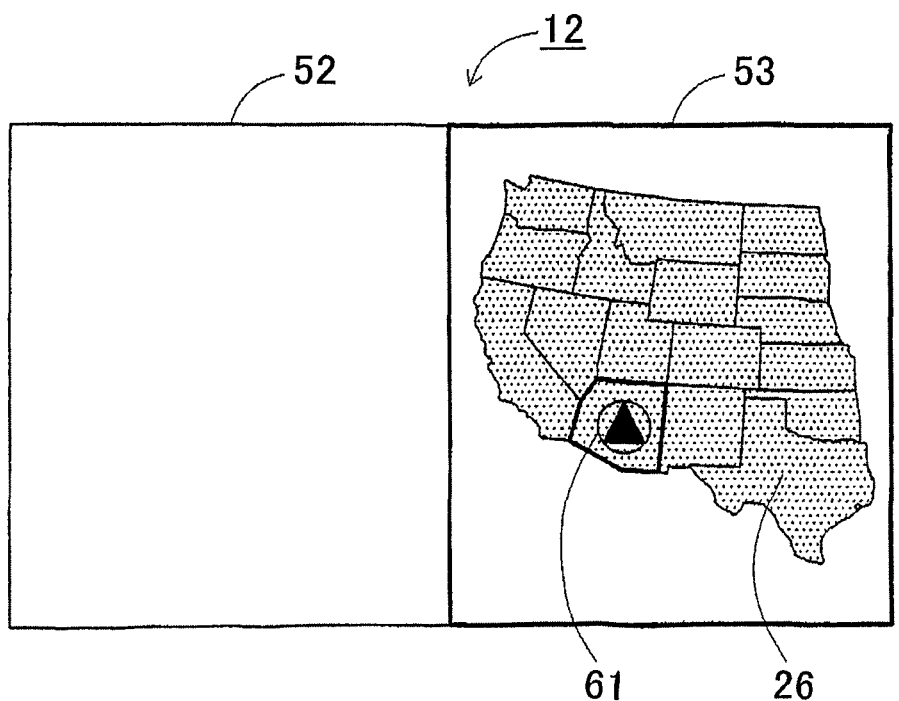
FIG. 7 schematically shows a state where a first navigation map information storage area is initialized.

Subsequently, as shown in FIG. 7, the CPU 41 initializes the first navigation map information storage area 52 (S16).

Figure 8:
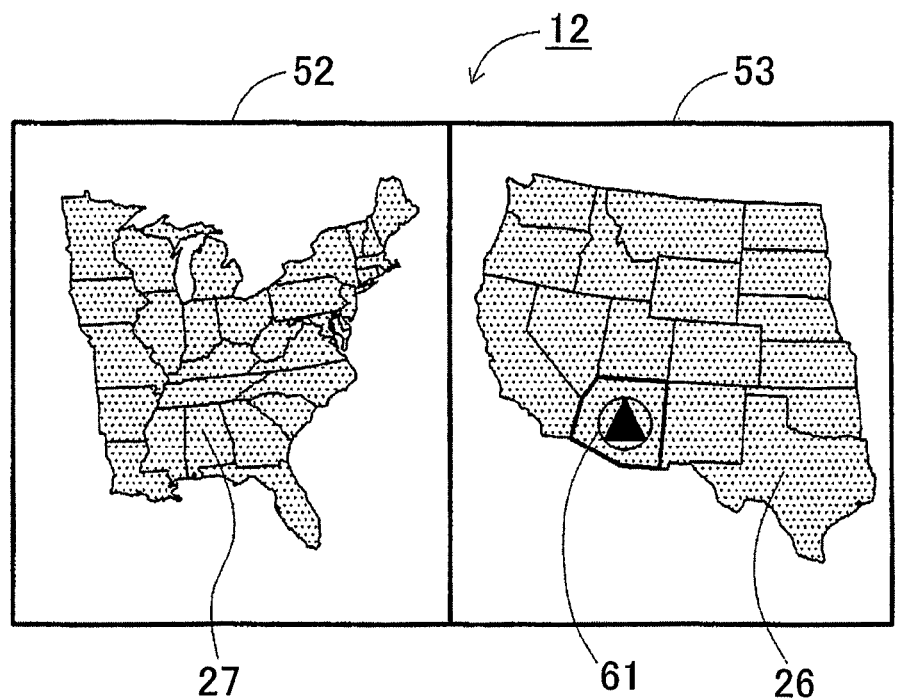
FIG. 8 schematically shows a state where the pieces of navigation map information stored in the navigation map information storage areas are updated.

As shown in FIG. 8, the CPU 41 then reads, from the CD-ROM 6, the "B" navigation map information 27 of the latest version and stores it in the initialized first navigation map information storage area 52. The CPU 41 then stores data indicating that the map information just stored in the first navigation map information storage area 52 is the "B" navigation map information 27, as well as the map coverage area, version, date of update and the like of the "B" navigation map information 27, in the management information storage area 54 as the management information 28 (S17 and S18).

Effects of First Embodiment

As detailed in the foregoing description, with the navigation apparatus 1 of the first embodiment, when an update instruction to update the navigation map information 26 and 27 is inputted, the CPU 41 initializes the navigation map information storage area having stored therein no navigation map information currently in use, out of the navigation map information storage areas 52 and 53. The CPU 41 then reads, from the CD-ROM 6 via the reading section 18, the "A" navigation map information 26 or the "B" navigation map information 27 of the latest version corresponding to the map coverage area containing the map information currently in use, and stores it in the initialized navigation map information storage area.

The CPU 41 then updates the management information 28, starts use of the newly stored navigation map information, initializes the navigation map information storage area having stored therein the map information whose use is stopped out of the navigation map information storage areas 52 and 53, reads, from the CD-ROM 6 via the reading section 18, the "A" navigation map information 26 or the "B" navigation map information 27, which is currently not in use, of the latest version, and stores it.

In this manner, the CPU 41 initializes each of the navigation map information storage areas 52 and 53, and thereafter stores the entire "A" navigation map information 26 or the entire "B" navigation map information 27 of the latest version in the initialized navigation map information storage areas 52 and 53. This avoids file fragmentation and the like, which may otherwise occur, when storing the "A" navigation map information 26 and the "B" navigation map information 27 of the latest version in the navigation map information storage areas 52 and 53.

Further, the CPU 41 initializes the storage area having stored therein no map information currently in use out of the navigation map information storage areas 52 and 53, thereafter stores therein the latest version of one of the "A" navigation map information 26 or the "B" navigation map information 27 corresponding to the map information currently in use, and then updates the management information 28. This makes it possible to store the update map information of the latest version and to use the update map information of the latest version during operations of the navigation apparatus 1.

Further, the "A" navigation map information 26 and the "B" navigation map information 27 are separated into two map coverage areas containing substantially equivalent amounts of information, i.e., data amounts. In this manner, by designing the first navigation map information storage area 52 and the second navigation map information storage area 53 to have substantially equivalent storage capacities, the navigation map information 26 and 27 having been recorded on the CD-ROM 6 can surely be stored in the navigation map information storage areas 52 and 53 in their entirety.

Second Embodiment

Next, a description will be given of a navigation apparatus 70 according to a second embodiment referring to FIGS. 9 to 15. The reference numerals identical to those of the navigation apparatus 1 of the first embodiment indicate the identical or corresponding parts of the navigation apparatus 1 of the first embodiment.

The overall structure of the navigation apparatus 70 of the second embodiment is structured substantially identical to the navigation apparatus 1 of the first embodiment. Additionally, the control structure and the control process of the navigation apparatus 70 of the second embodiment are substantially identical to those of the navigation apparatus 1 of the first embodiment.

The navigation apparatus 70 of the second embodiment is different from the navigation apparatus 1 of the first embodiment in that the data recording section 12 of the navigation apparatus 70 is provided with a map information DB storage area 71 (see FIG. 9), which will be described later, in place of the map information DB storage area 51. Another difference from the navigation apparatus 1 of the first embodiment is that the CPU 41 of the navigation apparatus 70 of the second embodiment executes a "map information updating process 2" (see FIG. 10), which will be described later, in place of the "map information updating process 1".

[Structure of Map Information DB Storage Area of Second Embodiment]

First, a description will be given of the structure of the data recording section 12 of the navigation apparatus 70 according to the second embodiment referring to FIG. 9.

Figure 9:
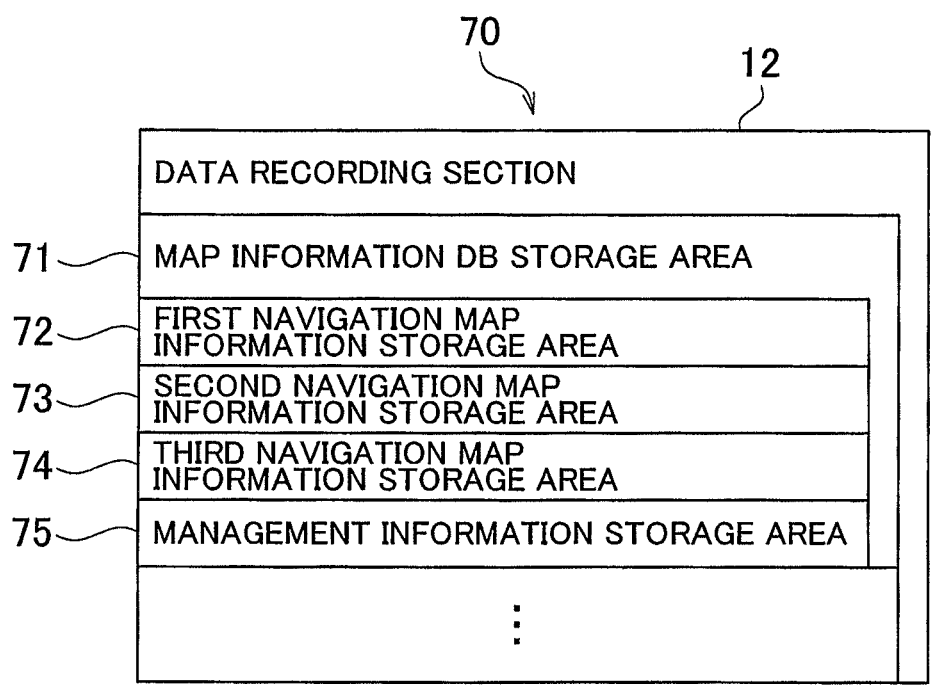
FIG. 9 is a block diagram showing the schematic structure of a data recording section of a navigation apparatus according to a second embodiment.

As shown in FIG. 9, the data recording section 12 is provided with areas such as the map information DB storage area 71 where the map information DB 25 is stored. The map information DB storage area 71 is provided with a first navigation map information storage area 72, a second navigation map information storage area 73, a third navigation map information storage area 74, a management information storage area 75, and the like. The first navigation map information storage area 72, the second navigation map information storage area 73 and the third navigation map information storage area 74 are designed to have substantially equivalent storage capacities, each being large enough to store the entire data of one of the "A" navigation map information 26 and the "B" navigation map information 27 read from the CD-ROM 6.

As will be described later, the "A" navigation map information 26 and the "B" navigation map information 27 of the latest version read from the CD-ROM 6 via the reading section 18 are then stored in a navigation map information storage area having stored therein no map information and in navigation map information storage areas in use before update among the navigation map information storage areas 72 to 74. Further, a navigation map information storage area having stored therein none of the "A" navigation map information 26 and the "B" navigation map information 27 of the latest version is initialized (see FIG. 10).

The management information 28 related to the navigation map information 26 and 27 (for example, navigation map information storage areas having stored therein the navigation map information 26 and 27, map coverage areas, versions, dates of update, and the like of the navigation map information 26 and 27) has been stored in the management information storage area 75. Accordingly, the contents of the map information DB 25 is updated by downloading update information, such as differential data distributed from the map information distribution center (not shown) via the communication apparatus 17 and any broad area map information of the latest version recorded on the CD-ROM 6.

[Map Information Updating Process 2]

Next, a description will be given of the "map information updating process 2" that is a process executed by the CPU 41 of the navigation apparatus 70 structured as described above so as to update navigation map information to the latest version while using the "A" navigation map information 26 or the "B" navigation map information 27, referring to FIGS. 10 to 15.

Figure 10:
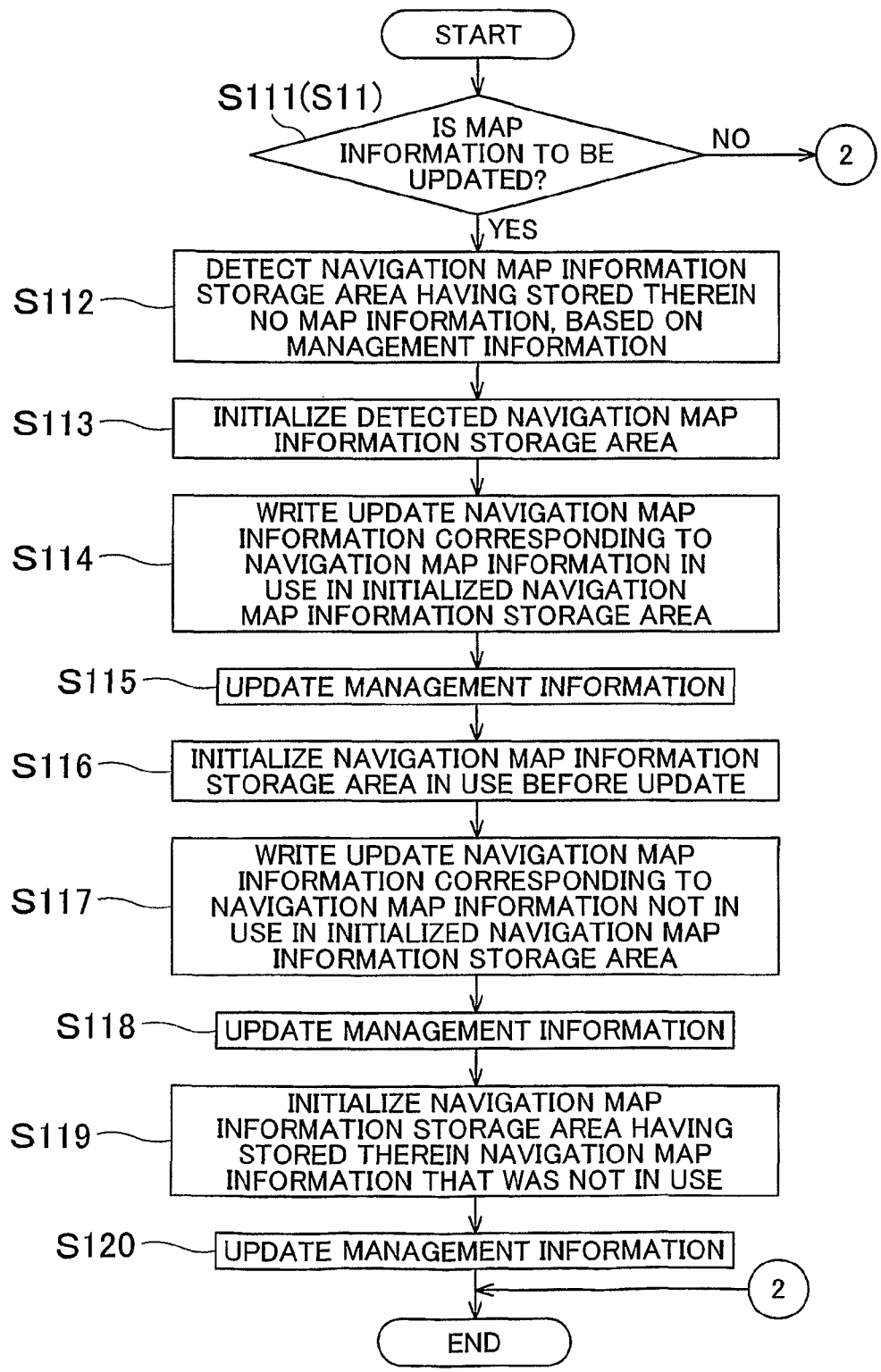
FIG. 10 is a flowchart showing a "map information updating process 2" that is a process executed by the CPU of the navigation apparatus of the second embodiment so as to update navigation map information to the latest version while using the "A" navigation map information or the "B" navigation map information.

FIG. 10 is a flowchart showing the "map information updating process 2" that is a process executed by the CPU 41 of the navigation apparatus 70 of the second embodiment so as to update navigation map information to the latest version while using the "A" navigation map information 26 or the "B" navigation map information 27.

The program shown in the flowchart of FIG. 10 has been stored in the ROM 43 included in the navigation control section 13 of the navigation apparatus 70, and is executed by the CPU 41 at prescribed time intervals (for example, at about every 10 to 100 milliseconds).

As shown in FIG. 10, first, in S111, the CPU 41 executes the process being identical to S11. When the update instruction to update the navigation map information 26 and 27 stored in the map information DB 25 is not inputted (S111: NO), the CPU 41 ends the map information updating process 2.

On the other hand, when the update instruction to update the navigation map information 26 and 27 stored in the map information DB 25 is inputted (S111: YES), the CPU 41 proceeds to S112.

In S112, the CPU 41 reads, from the management information 28, two navigation map information storage areas having stored therein the navigation map information 26 and 27. The CPU 41 then stores a remainder navigation map information storage area, i.e., the navigation map information storage area except for the read two navigation map information storage areas out of the navigation map information storage areas 72 to 74, in the RAM 42 as the navigation map information storage area having stored therein no map information currently.

For example, when the navigation map information storage areas having stored therein the navigation map information 26 and 27 read from the management information 28 are the navigation map information storage areas 72 and 73, the CPU 41 stores the third navigation map information storage area 74 in the RAM 42 as the navigation map information storage area having stored therein no map information currently.

In S113, the CPU 41 reads the navigation map information storage area having stored therein no map information currently from the RAM 42, and initializes the navigation map information storage area. For example, when the CPU 41 reads the third navigation map information storage area 74 from the RAM 42 as the navigation map information storage area having stored therein no map information currently, the CPU 41 initializes the third navigation map information storage area 74.

In S112 and S113, the CPU 41 may read, from the management information 28, the navigation map information storage area having stored therein no map information currently, and then initialize the navigation map information storage area.

In S114, the CPU 41 reads, from the CD-ROM 6, the navigation map information of the latest version corresponding to the navigation map information currently in use, and stores it in the initialized navigation map information storage area.

Specifically, the CPU 41 detects the host vehicle location based on the detection result of the current location detection processing section 11. Based on the management information 28, the CPU 41 then determines whether or not the coordinates (e.g., latitude and longitude) of the host vehicle location fall within the map coverage area of the "A" navigation map information 26.

When the host vehicle location falls within the map coverage area of the "A" navigation map information 26, the CPU 41 reads, from the CD-ROM 6, the "A" navigation map information 26 of the latest version, and stores it in the initialized navigation map information storage area. On the other hand, when the host vehicle location is not within the map coverage area of the "A" navigation map information 26, the CPU 41 reads, from the CD-ROM 6, the "B" navigation map information 27 of the latest version, and stores it in the initialized navigation map information storage area.

Subsequently, in S115, the CPU 41 updates the management information 28 in relation to the navigation map information storage area having just stored therein the navigation map information of the latest version. Specifically, the CPU 41 stores, in association with the navigation map information storage area having just stored therein the information, which one of the "A" navigation map information 26 and the "B" navigation map information 27 the navigation map information of the latest version corresponds to, as well as the map coverage area, version, date of update, and the like of the just stored navigation map information of the latest version, in the management information storage area 75 as the management information 28.

The CPU 41 also stops use of the navigation map information currently in use, and starts use of the navigation map information of the latest version. This enables the CPU 41 to use the map information of the latest version so as to display the surrounding map in connection with the host vehicle location, to perform route finding, and the like.

In S116, the CPU 41 detects the navigation map information storage area having stored therein the navigation map information whose use is stopped, that is, the navigation map information storage area having stored therein the navigation map information of the old version corresponding to the navigation map information of the latest version whose use is started, based on the management information 28. The CPU 41 then initializes the detected navigation map information storage area having stored therein the navigation map information of the old version, that is, the navigation map information storage area having stored therein the navigation map information in use before the update.

Subsequently, in S117, the CPU 41 refers to the management information 28 to determine whether the navigation map information of the latest version currently in use is the "A" navigation map information 26 or the "B" navigation map information 27. When the navigation map information of the latest version currently in use is the "A" navigation map information 26, the CPU 41 reads, from the CD-ROM 6, the "B" navigation map information 27 of the latest version, and stores it in the initialized navigation map information storage area.

On the other hand, when the navigation map information of the latest version currently in use is the "B" navigation map information 27, the CPU 41 reads, from the CD-ROM 6, the "A" navigation map information 26 of the latest version, and stores it in the initialized navigation map information storage area. In other words, the CPU 41 reads, from the CD-ROM 6, the navigation map information of the latest version corresponding to the navigation map information not currently in use, and stores it in the initialized navigation map information storage area.

In S118, the CPU 41 updates the management information 28 in relation to the navigation map information storage area having just stored therein the navigation map information of the latest version. Specifically, the CPU 41 stores, in association with the navigation map information storage area having just stored therein the information, which one of the "A" navigation map information 26 and the "B" navigation map information 27 the navigation map information of the latest version corresponds to, as well as the map coverage area, version, date of update, and the like of the just stored navigation map information of the latest version, in the management information storage area 75 as the management information 28.

In S119, the CPU 41 refers to the management information 28 to determine which one of the navigation map information storage areas 72 to 74 the navigation map information storage area having stored therein the navigation map information of the old version not in use corresponds to. The CPU 41 then initializes the navigation map information storage area having stored therein the navigation map information of the old version.

Subsequently, in S120, the CPU 41 updates the management information 28 in relation to the initialized navigation map information storage area, and thereafter ends the map information updating process 2. Specifically, the CPU 41 stores data indicating that no map information has been stored in the initialized navigation map information storage area, as well as the date of update and the like, in the management information storage area 75 as the management information 28, and thereafter ends the map information updating process 2.

Here, referring to FIGS. 11 to 15, a description will be given of an exemplary case of updating the map information where the CPU 41 receives an update instruction to update the navigation map information 26 and 27 while the "A" navigation map information 26 stored in the first navigation map information storage area 72 is in use. In this exemplary case, the "A" navigation map information 26 is map information of a map coverage area of substantially western half of the United States. The "B" navigation map information 27 is map information of a map coverage area of substantially eastern half of the United States. The boundary between the "A" navigation map information 26 and the "B" navigation map information 27 is set so as to separate them into substantially two eastern and western halves along the state lines.

Figure 11:
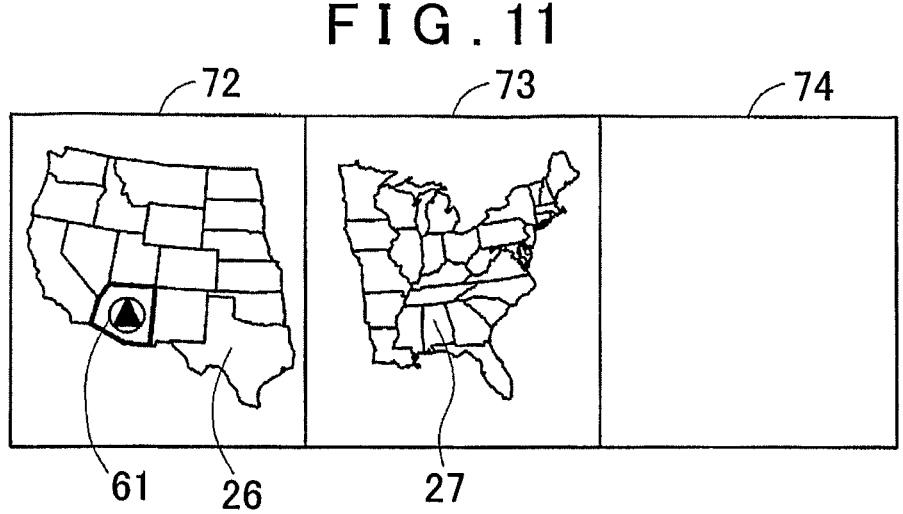
FIG. 11 schematically shows exemplary navigation map information stored in navigation map information storage areas before update.

First, as shown in FIG. 11, the first navigation map information storage area 72 has stored therein the "A" navigation map information 26 being the map coverage area of substantially western half of the United States, whereas the second navigation map information storage area 73 has stored therein the "B" navigation map information 27 being the map coverage area of substantially eastern half of the United States. The third navigation map information storage area 74 has stored therein no navigation map information. The management information storage area 75 has stored therein, as the management information 28, data indicating that the "A" navigation map information 26 has been stored in the first navigation map information storage area 72, the "B" navigation map information 27 has been stored in the second navigation map information storage area 73, and that no navigation map information has been stored in the third navigation map information storage area 74.

When an update instruction to update the navigation map information 26 and 27 is inputted from the operation section 14, the CPU 41 reads, from the management information 28, the navigation map information storage areas 72 and 73 having stored therein the navigation map information 26 and 27. The CPU 41 then recognizes the third navigation map information storage area 74 being the remainder except for the read navigation map information storage areas 72 and 73 out of the navigation map information storage areas 72 to 74 as the navigation map information storage area having stored therein no map information currently, and initializes the third navigation map information storage area 74 (S111: YES to S113).

Figure 12:
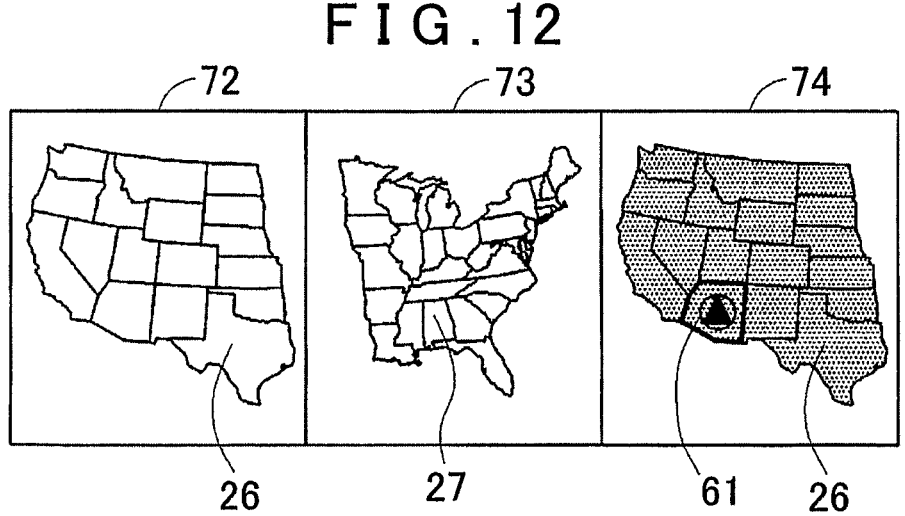
FIG. 12 schematically shows a state where storing of the latest version of the "A" navigation map information in use in a third navigation map information storage area is completed and use is switched to the "A" navigation map information of the latest version.

Subsequently, as shown in FIG. 12, the CPU 41 detects the host vehicle location based on the detection result of the current location detection processing section 11. The CPU 41 then determines that, as indicated by a vehicle location mark 61, the host vehicle location is at Phoenix, Ariz., on the "A" navigation map information 26 stored in the first navigation map information storage area 72. In other words, the CPU 41 determines that the "A" navigation map information 26 stored in the first navigation map information storage area 72 is currently in use, reads the "A" navigation map information 26 of the latest version from the CD-ROM 6, and stores it in the initialized third navigation map information storage area 74. The CPU 41 then stores data indicating that the map information just stored in the third navigation map information storage area 74 is the "A" navigation map information 26, as well as the map coverage area, version, date of update and the like of the "A" navigation map information 26, in the management information storage area 75 as the management information 28. As indicated by the vehicle location mark 61, the CPU 41 stops use of the "A" navigation map information 26 stored in the first navigation map information storage area 72 and starts use of the "A" navigation map information 26 of the latest version just stored in the third navigation map information storage area 74 (S114 and S115).

Figure 13:
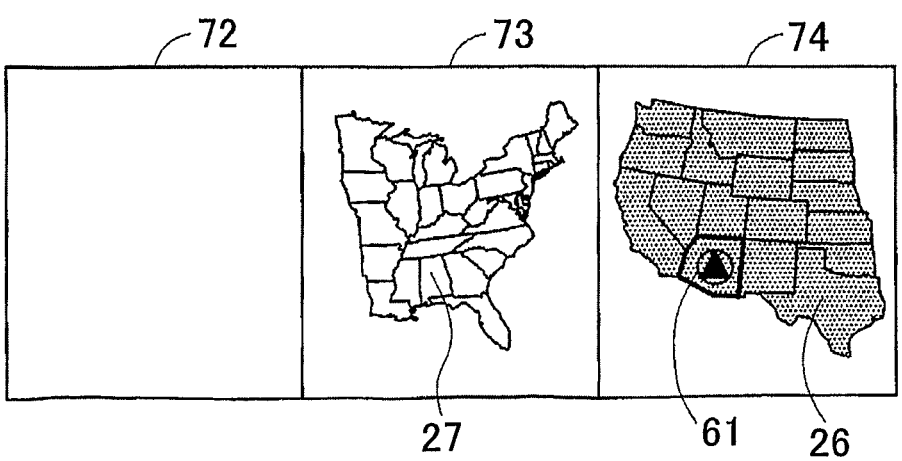
FIG. 13 schematically shows a state where a first navigation map information storage area is initialized.

As shown in FIG. 13, the CPU 41 then detects the first navigation map information storage area 72 having stored therein the "A" navigation map information 26 of the old version corresponding to the "A" navigation map information 26 of the latest version whose use is started, based on the management information 28. The CPU 41 then initializes the detected first navigation map information storage area 72 having stored therein the "A" navigation map information 26 of the old version (S116).

Figure 14:
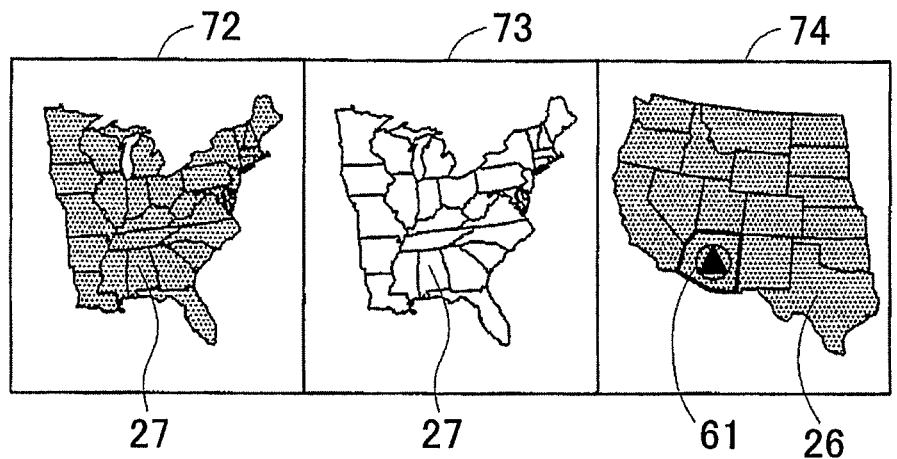
FIG. 14 schematically shows a state where the first navigation map information storage area has just stored therein the "B" navigation map information of the latest version.

As shown in FIG. 14, the CPU 41 then reads, from the CD-ROM 6, the "B" navigation map information 27 of the latest version and stores it in the initialized first navigation map information storage area 72. The CPU 41 then stores data indicating that the map information just stored in the first navigation map information storage area 72 is the "B" navigation map information 27, as well as the map coverage area, version, date of update and the like of the "B" navigation map information 27, in the management information storage area 75 as the management information 28 (S117 and S118).

Figure 15:
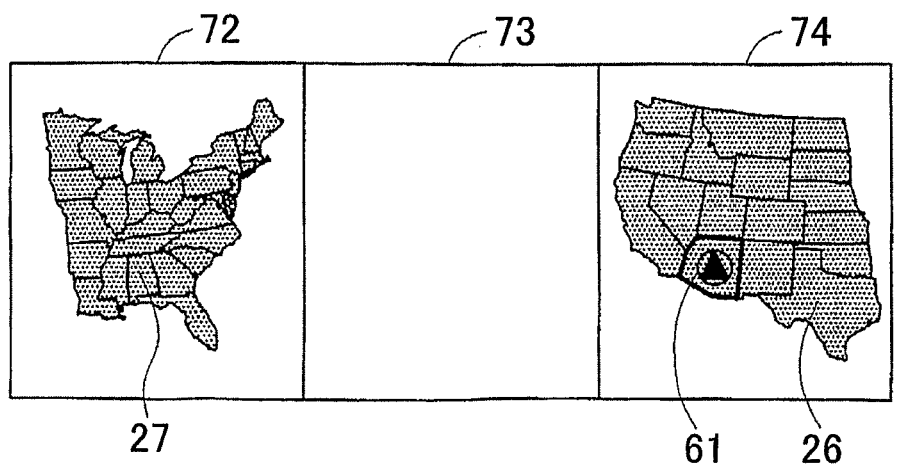
FIG. 15 schematically shows a state where the pieces of navigation map information stored in the navigation map information storage areas are updated.

As shown in FIG. 15, the CPU 41 then detects the second navigation map information storage area 73 having stored therein the "B" navigation map information 27 of the old version corresponding to the "B" navigation map information 27 of the latest version, based on the management information 28. The CPU 41 then initializes the detected second navigation map information storage area 73 having stored therein the "B" navigation map information 27 of the old version. The CPU 41 then stores data indicating that no map information has been stored in the initialized second navigation map information storage area 73, as well as the date of update and the like, in the management information storage area 75 as the management information 28 and thereafter ends the map information updating process 2 (S119 and S120).

Effects of Second Embodiment

As detailed in the foregoing description, with the navigation apparatus 70 of the second embodiment, when an update instruction to update the navigation map information 26 and 27 is inputted, the CPU 41 initializes the navigation map information storage area having stored therein no navigation map information, out of the navigation map information storage areas 72 to 74. The CPU 41 then reads, from the CD-ROM 6 via the reading section 18, the "A" navigation map information 26 or the "B" navigation map information 27 of the latest version corresponding to the map coverage area containing the map information currently in use, and stores it in the initialized navigation map information storage area.

Subsequently, the CPU 41 updates the management information 28, and starts use of the newly stored navigation map information of the latest version. The CPU 41 then initializes the navigation map information storage area having stored therein the navigation map information whose use is stopped out of the navigation map information storage areas 72 to 74, reads, from the CD-ROM 6 via reading section 18, the "A" navigation map information 26 or the "B" navigation map information 27, which is currently not in use, of the latest version, and stores it. The CPU 41 then updates the management information 28, and initializes the navigation map information storage area having stored therein the "A" navigation map information 26 or the "B" navigation map information 27 of the old version. Subsequently, the CPU 41 again updates the management information 28.

In this manner, the CPU 41 initializes the navigation map information storage area having stored therein no navigation map information out of the navigation map information storage areas 72 to 74, and stores the "A" navigation map information 26 or the "B" navigation map information 27 of the latest version corresponding to the navigation map information currently in use. This avoids file fragmentation and the like. Further, the CPU 41 updates the management information 28 and then starts use of the newly stored navigation map information of the latest version. This makes it possible to update the navigation map information currently in use to the latest version and to automatically switch to place the updated information into use during operations of the navigation apparatus 70.

Still further, the CPU 41 initializes the navigation map information storage area having stored therein the navigation map information whose use is stopped, and stores the "A" navigation map information 26 or the "B" navigation map information 27 of the latest version corresponding to the navigation map information not currently in use. This avoids file fragmentation and the like. The CPU 41 also updates the management information 28. This makes it possible to update the "A" navigation map information 26 and the "B" navigation map information 27 to the latest version and to automatically switch to place the navigation map information 26 and 27 of the latest version into use during operations of the navigation apparatus 70.

Still further, the CPU 41 updates the management information 28, thereafter initializes the navigation map information storage area having stored therein the "A" navigation map information 26 or the "B" navigation map information 27 of the old version, and thereafter again updates the management information 28. Thus, it becomes possible to always select one navigation map information storage area having stored therein no map information, that is, a free storage area, based on the management information 28.

If storing of the navigation map information of the latest version in the initialized navigation map information storage area out of the navigation map information storage areas 72 to 74 is aborted midway through the procedure, the navigation map information storage area having stored therein the navigation map information of the old version corresponding to the navigation map information of the latest version is not initialized, and the management information 28 remains. This enables the CPU 41 to use the entire map information based on the management information 28.

Further, the "A" navigation map information 26 and the "B" navigation map information 27 are separated into two map coverage areas containing substantially equivalent amounts of information, i.e., data amounts. In this manner, by designing the navigation map information storage areas 72 to 74 to have substantially equivalent storage capacities, the navigation map information 26 and 27 recorded on the CD-ROM 6 can surely be stored in the navigation map information storage areas 72 to 74 in their entirety.

Third Embodiment

Next, a description will be given of a navigation apparatus 80 according to a third embodiment referring to FIGS. 16 to 26.

The reference numerals identical to those of the navigation apparatus 1 of the first embodiment indicate the identical or corresponding parts of the navigation apparatus 1 of the first embodiment. The overall structure of the navigation apparatus 80 of the third embodiment is structured substantially identical to the navigation apparatus 1 of the first embodiment. Additionally, the control structure and the control process of the navigation apparatus 80 of the third embodiment are substantially identical to those of the navigation apparatus 1 of the first embodiment.

The navigation apparatus 80 of the third embodiment is different from the navigation apparatus 1 of the first embodiment in that the data recording section 12 of the navigation apparatus 80 is provided with a map information DB 81 (see FIG. 16), which will be described later, in place of the map information DB 25. Another difference from the navigation apparatus 1 of the first embodiment is that the CPU 41 of the navigation apparatus 80 of the third embodiment executes a "map information updating process 3" (see FIG. 18), which will be described later, in place of the "map information updating process 1".

[Structure of Map Information DB of Third Embodiment]

First, a description will be given of the structure of the data recording section 12 of the navigation apparatus 80 of the third embodiment referring to FIGS. 16 and 17.

Figure 16:
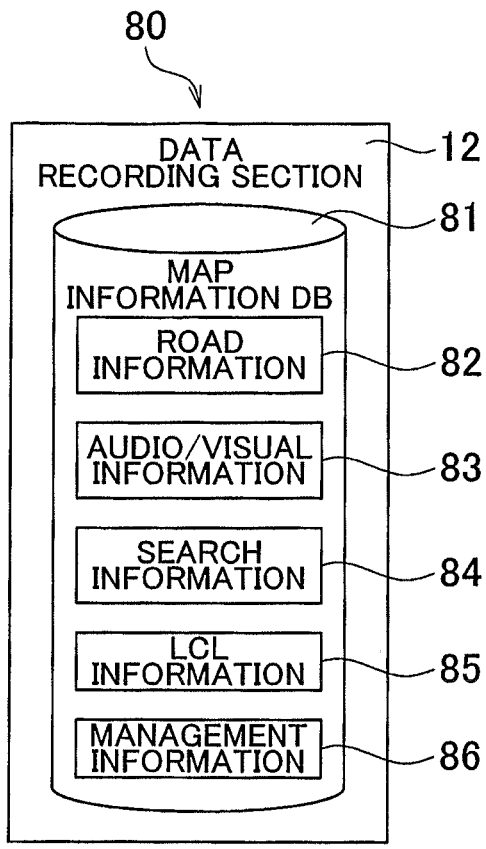
FIG. 16 is a block diagram showing a data recording section of a navigation apparatus according to a third embodiment.
Figure 17:
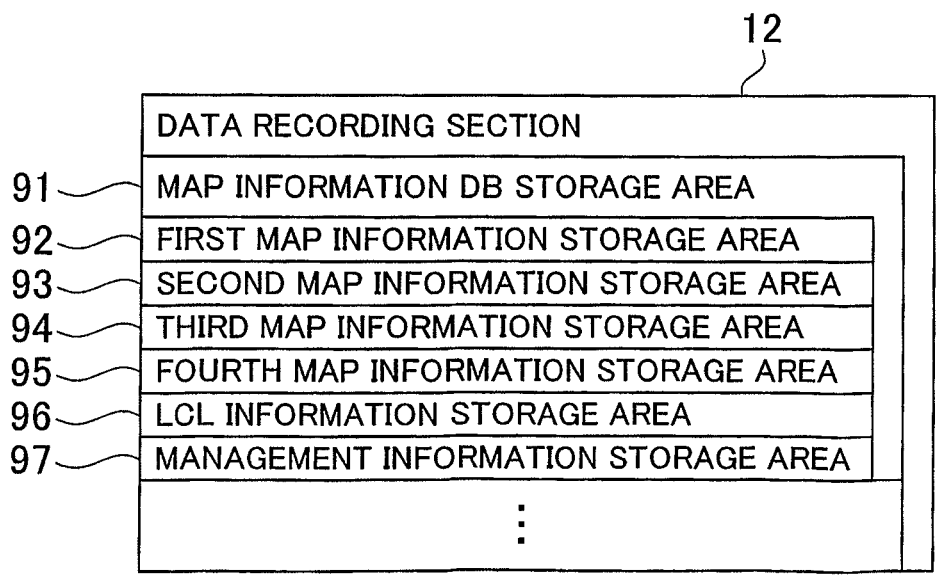
FIG. 17 is a block diagram showing the schematic structure of the data recording section of the navigation apparatus according to the third embodiment.

As shown in FIGS. 16 and 17, the data recording section 12 is provided with areas such as a map information DB storage area 91 where the map information DB 81 is stored. The map information DB storage area 91 is provided with a first map information storage area 92, a second map information storage area 93, a third map information storage area 94, a fourth map information storage area 95, an LCL information storage area 96, a management information storage area 97, and the like.

The first map information storage area 92, the second map information storage area 93, the third map information storage area 94 and the fourth map information storage area 95 are designed to have substantially equivalent storage capacities, each being large enough to store the entire data of one of road information 82, audio/visual information 83, and search information 84 of the latest version read from the CD-ROM 6.

Here, the CD-ROM 6 of the third embodiment has stored therein broad area map information, such as a nationwide map of Japan or the United States, or a West European map, of the latest version, for use in drive guidance or route finding with the navigation apparatus 80. The broad area map information is structured with the road information 82, the audio/visual information 83 and the search information 84 having substantially equivalent amounts of information, i.e., data amounts. The broad area map information has stored therein LCL information structured with city plans, local information and the like.

The road information 82 is structured with new road information, map display data for displaying any map, intersection data related to intersections, node data related to nodes, link data related to roads (links), and the like. The audio/visual information 83 is structured with voice guidance information for guiding routes, stereoscopic information of intersections, and the like. The search information 84 is structured with finding data for finding routes, store data as to POI (Point of Interest), such as stores, i.e., one type of facilities, search data for searching for geographical points, and the like.

As will be described later, the road information 82, the audio/visual information 83, and the search information 84 of the latest version read from the CD-ROM 6 via the reading section 18 are stored in a map information storage area having stored therein no map information and in map information storage areas in use before update among the map information storage areas 92 to 95. Further, as will be described later, a map information storage area having stored therein none of the road information 82, the audio/visual information 83, and the search information 84 of the latest version is initialized (see FIG. 18).

Still further, as will be described later, the LCL information structured with city plans, local information and the like of the latest version read from the CD-ROM 6 via the reading section 18 is stored in the LCL information storage area 96 (see FIG. 18). Still further, the management information 86 related to the road information 82, the audio/visual information 83, the search information 84, and the LCL information 85 are stored in the management information storage area 97. The management information 86 includes map information storage areas having stored therein the information 82 to 85, versions, dates of update and the like of the information 82 to 85. Accordingly, the contents of the map information DB 81 is updated by downloading update information such as differential data distributed from a map information distribution center (not shown) via the communication apparatus 17 or any broad area map information of the latest version recorded on the CD-ROM 6.

[Map Information Updating Process 3]

Next, a description will be given of the "map information updating process 3" that is a process executed by the CPU 41 of the navigation apparatus 80 structured as described above so as to update map information to the latest version, while using the road information 82, the audio/visual information 83, and the search information 84, referring to FIGS. 18 to 26.

Figure 18:
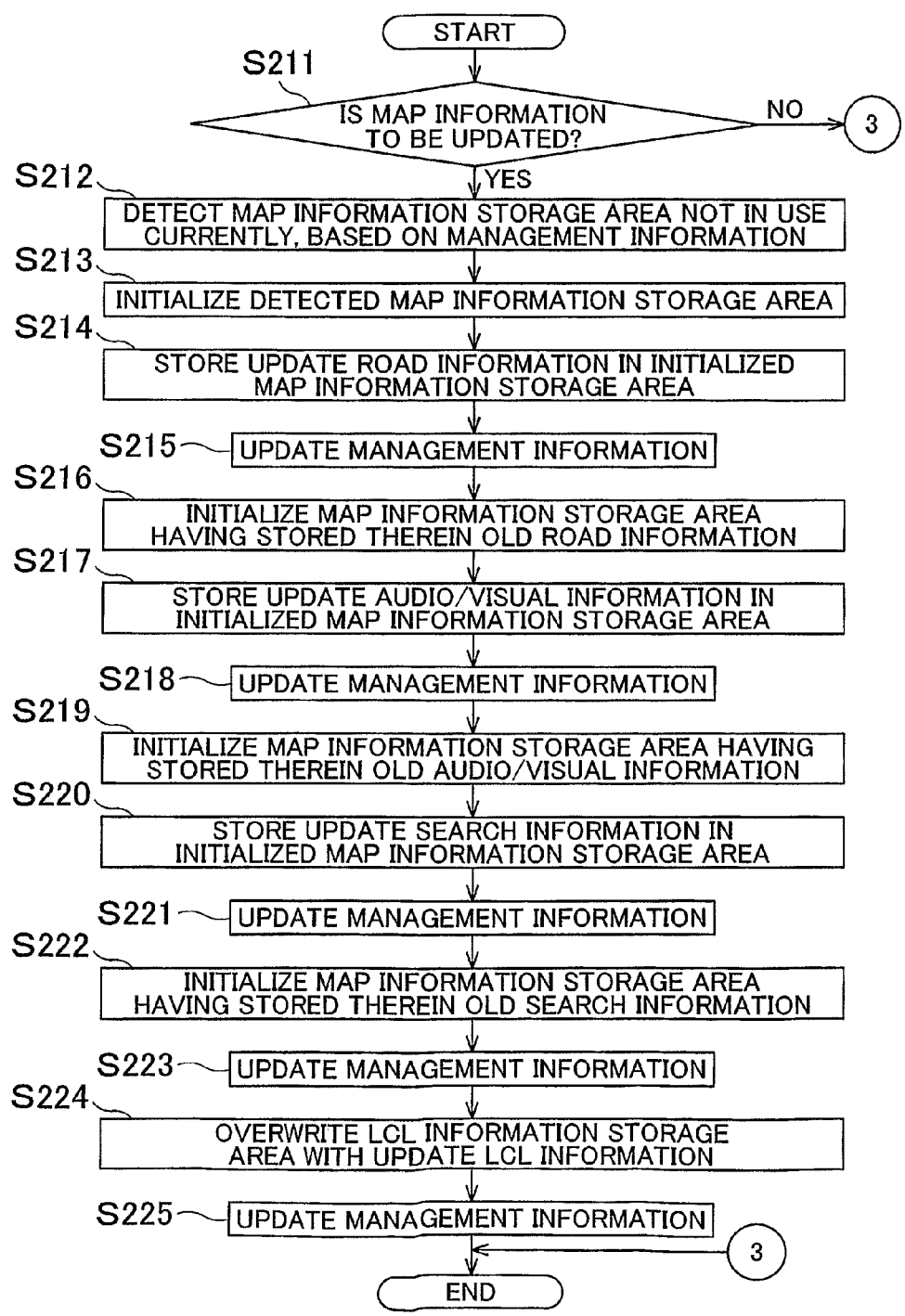
FIG. 18 is a flowchart showing a "map information updating process 3" that is a process executed by the CPU of the navigation apparatus of the third embodiment so as to update map information to the latest version while using map information having been recorded in the data recording section.

FIG. 18 is a flowchart showing the "map information updating process 3" that is a process executed by the CPU 41 of the navigation apparatus 80 of the third embodiment so as to update map information to the latest version, while using the road information 82, the audio/visual information 83, and the search information 84.

The program shown in the flowchart of FIG. 18 has been stored in the ROM 43 included in the navigation control section 13 of the navigation apparatus 80, and is executed by the CPU 41 at prescribed time intervals (for example, at about every 10 to 100 milliseconds).

As shown in FIG. 18, first, in S211, the CPU 41 reads map information of the latest version from the CD-ROM 6 installed in the reading section 18, in accordance with any input operation or the like of the operation section 14, such as the touch screen and the operational switch so as to execute a determination processing of determining whether or not an update instruction to update the road information 82, the audio/visual information 83, the search information 84, and the LCL information 85 stored in the map information DB 81 is inputted.

When the update instruction to update the road information 82, the audio/visual information 83, the search information 84, and the LCL information 85 stored in the map information DB 81 is not inputted (S211: NO), the CPU 41 ends the map information updating process 3. On the other hand, when the update instruction to update the road information 82, the audio/visual information 83, the search information 84, and the LCL information 85 stored in the map information DB 81 is inputted (S211: YES), the CPU 41 proceeds to S212.

In S212, the CPU 41 reads, from the management information 86, three map information storage areas having stored therein the road information 82, the audio/visual information 83, and the search information 84. The CPU 41 then stores a remainder map information storage area, i.e., the map information storage area except for the read three map information storage areas out of the map information storage areas 92 to 95, in the RAM 42 as the map information storage area having stored therein no map information currently.

For example, when the three map information storage areas having stored therein the road information 82, the audio/visual information 83, and the search information 84 read from the management information 86 are the map information storage areas 92 to 94, the CPU 41 stores the fourth map information storage area 95 in the RAM 42 as the map information storage area having stored therein no map information currently.

In S213, the CPU 41 reads the map information storage area having stored therein no map information currently from the RAM 42 and initializes the map information storage area. For example, when the CPU 41 reads the fourth map information storage area 95 from the RAM 42 as the map information storage area having stored therein no map information currently, the CPU 41 initializes the fourth map information storage area 95.

In S212 and S213, the CPU 41 may read, from the management information 86, the map information storage area having stored therein no map information currently, and then initialize the map information storage area.

In S214, the CPU 41 reads, from the CD-ROM 6, the road information 82 of the latest version corresponding to the road information 82 currently in use, and stores it in the initialized map information storage area. Here, as to the update priority of the road information 82, the audio/visual information 83, and the search information 84, the road information 82 is given the first priority, the audio/visual information 83 is given the second priority, and the search information 84 is given the third priority previously, and the ROM 43 has stored therein the update priority. The update priority of the road information 82, the audio/visual information 83, and the search information 84 is not limited thereto, and may be prioritized as appropriate.

Subsequently, in S215, the CPU 41 updates the management information 86 in relation to the map information storage area having just stored therein the road information 82 of the latest version. Specifically, the CPU 41 stores, in association with the map information storage area having just stored therein the information 82, version, date of update and the like of the road information 82, in the management information storage area 97 as the management information 86. The CPU 41 also stops use of the road information 82 currently in use, and starts use of the road information 82 of the latest version. This enables the CPU 41 to use the road information 82 of the latest version so as to display the surrounding map in connection with the host vehicle location, to perform route finding and the like.

In S216, the CPU 41 detects the map information storage area having stored therein the road information 82 whose use is stopped, that is, the map information storage area having stored therein the road information 82 of the old version corresponding to the road information 82 of the latest version whose use is started, based on the management information 86. The CPU 41 then initializes the detected map information storage area having stored therein the road information 82 of the old version, that is, the map information storage area having stored therein the road information 82 in use before the update.

Subsequently, in S217, the CPU 41 reads, from the CD-ROM 6, the audio/visual information 83, given the second update priority, of the latest version, and stores it in the initialized map information storage area.

In S218, the CPU 41 updates the management information 86 in relation to the map information storage area having just stored therein the audio/visual information 83 of the latest version. Specifically, the CPU 41 stores, in association with the map information storage area having just stored therein the information 83, the version, date of update and the like of the audio/visual information 83, in the management information storage area 97 as the management information 86. The CPU 41 also stops use of the audio/visual information 83 currently in use, and starts use of the audio/visual information 83 of the latest version. This enables the CPU 41 to use the audio/visual information 83 of the latest version to perform route guidance and the like.

In S219, the CPU 41 detects the map information storage area having stored therein the audio/visual information 83 whose use is stopped, that is, the map information storage area having stored therein the audio/visual information 83 of the old version corresponding to the audio/visual information 83 of the latest version whose use is started, based on the management information 86. The CPU 41 then initializes the detected map information storage area having stored therein the audio/visual information 83 of the old version, that is, the map information storage area having stored therein the audio/visual information 83 in use before the update.

Subsequently, in S220, the CPU 41 reads, from the CD-ROM 6, the search information 84, given the third update priority, of the latest version, and stores it in the initialized map information storage area.

In S221, the CPU 41 updates the management information 86 in relation to the map information storage area having just stored therein the search information 84 of the latest version. Specifically, the CPU 41 stores, in association with the map information storage area having just stored therein the information 84, the version, date of update and the like of the search information 84, in the management information storage area 97 as the management information 86. The CPU 41 also stops use of the search information 84 currently in use, and starts use of the search information 84 of the latest version. This enables the CPU 41 to use the search information 84 of the latest version to perform route finding and the like.

In S222, the CPU 41 detects the map information storage area having stored therein the search information 84 whose use is stopped, that is, the map information storage area having stored therein the search information 84 of the old version corresponding to the search information 84 of the latest version whose use is started, based on the management information 86. The CPU 41 then initializes the detected map information storage area having stored therein the search information 84 of the old version, that is, the map information storage area having stored therein the search information 84 in use before the update.

Subsequently, in S223, the CPU 41 updates the management information 86 in relation to the initialized map information storage area. Specifically, the CPU 41 stores, in association with the initialized map information storage area, data indicating that no map information is stored therein, as well as the date of update and the like, in the management information storage area 97 as the management information 86.

In S224, the CPU 41 stops use of the LCL information 85. The CPU 41 then reads, from the CD-ROM 6, the LCL information 85 of the latest version, overwrites the LCL information storage area 96 with it, and updates the LCL information 85 to the latest version. The CPU 41 then starts use of the LCL information 85. In S212, the CPU 41 may stop use of the LCL information 85. In other words, the CPU 41 may stop use of the LCL information 85 during update of the road information 82, the audio/visual information 83, the search information 84, and the LCL information 85.

In S225, the CPU 41 updates the management information 86 in relation to the LCL information storage area 96, and thereafter ends the map information updating process 3. Specifically, the CPU 41 stores, in association with the LCL information storage area 96, the version, date of update and the like of the LCL information 85 in the management information storage area 97 as the management information 86, and thereafter ends the map information updating process 3.

Here, referring to FIGS. 19 to 26, a description will be given of an exemplary case of updating the map information where the CPU 41 receives an update instruction to update the road information 82, the audio/visual information 83, and the search information 84, while the road information 82, the audio/visual information 83, and the search information 84 stored in the map information storage areas 92 to 94 are in use.

Figure 19:
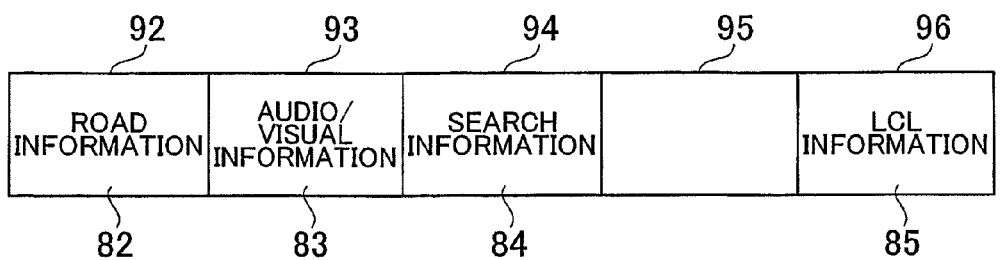
FIG. 19 schematically shows exemplary map information stored in map information storage areas and an LCL information storage area before update.

First, as shown in FIG. 19, the map information storage areas 92 to 94 have stored therein the road information 82, the audio/visual information 83, and the search information 84, whereas the fourth map information storage area 95 has stored therein no map information. The LCL information storage area 96 has stored therein the LCL information 85. The management information storage area 97 has stored therein, as the management information 86, versions, dates of update and the like of the information 82 to 85 in association with the map information storage areas 92 to 94, and the LCL information storage area 96, respectively. The management information storage area 97 has stored therein, as the management information 86, data indicating that the fourth map information storage area 95 has stored therein no map information.

When an update instruction to update the road information 82, the audio/visual information 83, the search information 84 and the LCL information 96 is inputted from the operation section 14, the CPU 41 reads, from the management information 86, the three map information storage areas 92 to 94 having stored therein the road information 82, the audio/visual information 83, and the search information 84. The CPU 41 then recognizes the fourth map information storage area 95 being the remainder except for the read three map information storage areas 92 to 94 out of the map information storage areas 92 to 95 as the map information storage area having stored therein no map information currently, and initializes the fourth map information storage area 95 (S211: YES to S213). The CPU 41 may read, from the management information 86, the fourth map information storage area 95 having stored therein no map information currently, and initialize the fourth map information storage area 95.

Figure 20:
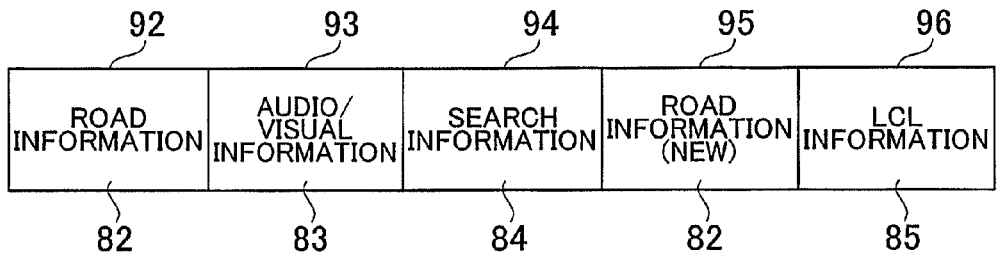
FIG. 20 schematically shows a state where storing of the latest version of road information in use in a fourth map information storage area is completed and use is switched to the road information of the latest version.

Subsequently, as shown in FIG. 20, the CPU 41 reads, from the CD-ROM 6, the road information 82 of the latest version corresponding to the road information 82 currently in use, and stores it in the initialized fourth map information storage area 95. The CPU 41 then stores data indicating that the map information just stored in the fourth map information storage area 95 is the road information 82 of the latest version, as well as the version, date of update and the like of the road information 82, in the management information storage area 97 as the management information 86. The CPU 41 also stops use of the road information 82 stored in the first map information storage area 92, and starts use of the road information 82 of the latest version just stored in the fourth map information storage area 95 (S214 and S215).

Figure 21:
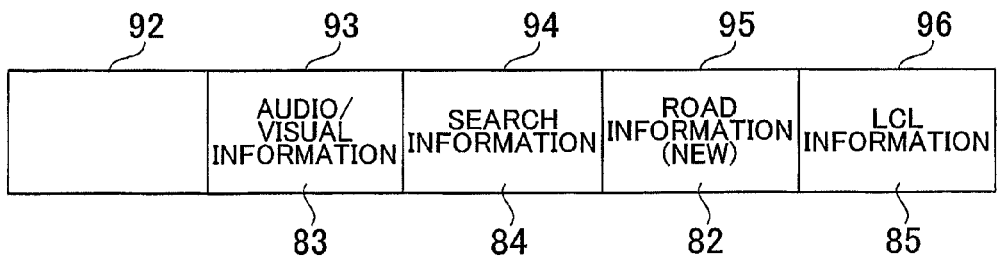
FIG. 21 schematically shows a state where a first map information storage area is initialized.

As shown in FIG. 21, the CPU 41 then detects the first map information storage area 92 having stored therein the road information 82 whose use is stopped, that is, the first map information storage area 92 having stored therein the road information 82 of the old version corresponding to the road information 82 of the latest version whose use is started, based on the management information 86. The CPU 41 then initializes the detected first map information storage area 92 having stored therein the road information 82 of the old version (S216).

Figure 22:
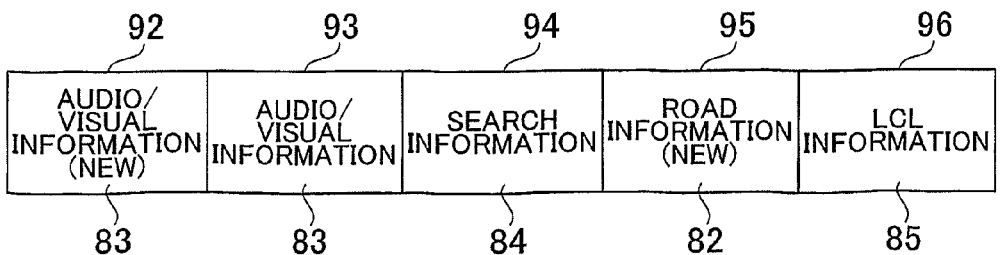
FIG. 22 schematically shows a state where storing of audio/visual information of the latest version in the first map information storage area is completed and use is switched to the audio/visual information of the latest version.

As shown in FIG. 22, the CPU 41 then reads, from the CD-ROM 6, the audio/visual information 83, given the second update priority, of the latest version, and stores it in the initialized first map information storage area 92. The CPU 41 then stores data indicating that the map information just stored in the first map information storage area 92 is the audio/visual information 83 of the latest version, as well as the version, date of update and the like of the audio/visual information 83, in the management information storage area 97 as the management information 86. The CPU 41 also stops use of the audio/visual information 83 stored in the second map information storage area 93, and starts use of the audio/visual information 83 of the latest version just stored in the first map information storage area 92 (S217 and S218).

Figure 23:
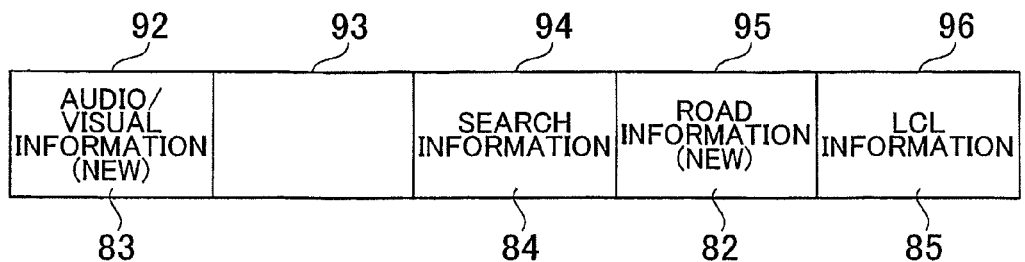
FIG. 23 schematically shows a state where a second map information storage area is initialized.

Subsequently, as shown in FIG. 23, the CPU 41 detects the second map information storage area 93 having stored therein the audio/visual information 83 whose use is stopped, that is, the second map information storage area 93 having stored therein the audio/visual information 83 of the old version corresponding to the audio/visual information 83 of the latest version whose use is started, based on the management information 86. The CPU 41 then initializes the detected second map information storage area 93 having stored therein the audio/visual information 83 of the old version (S219).

Figure 24:
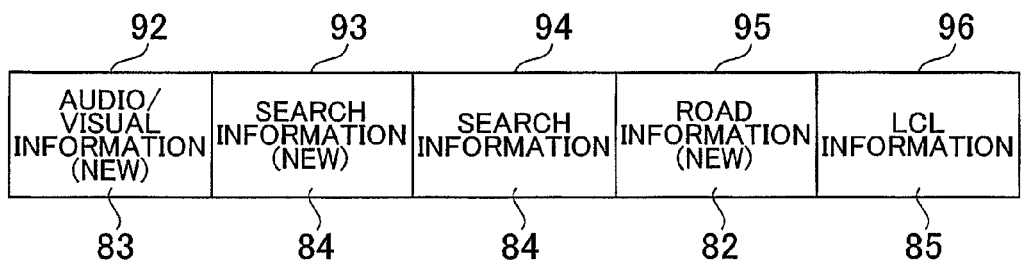
FIG. 24 schematically shows a state where storing of search information of the latest version in the second map information storage area is completed and use is switched to the search information of the latest version.

As shown in FIG. 24, the CPU 41 then reads, from the CD-ROM 6, the search information 84, given the third update priority, of the latest version, and stores it in the initialized second map information storage area 93. The CPU 41 then stores data indicating that the map information just stored in the second map information storage area 93 is the search information 84 of the latest version, as well as the version, date of update and the like of the search information 84, in the management information storage area 97 as the management information 86. The CPU 41 also stops use of the search information 84 stored in the third map information storage area 94, and starts use of the search information 84 of the latest version just stored in the second map information storage area 93 (S220 and S221).

Figure 25:
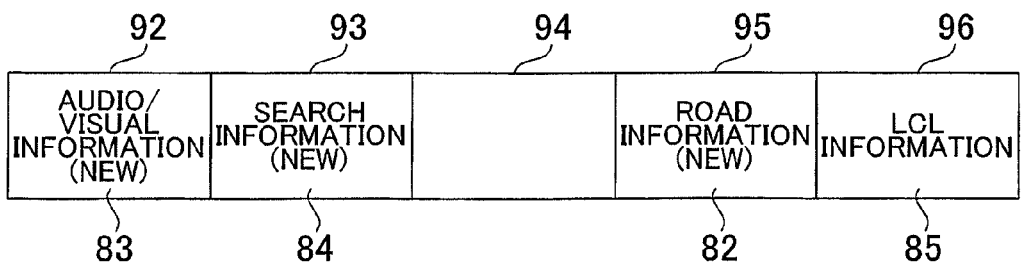
FIG. 25 schematically shows a state where a third map information storage area is initialized.

As shown in FIG. 25, the CPU 41 then detects the third map information storage area 94 having stored therein the search information 84 whose use is stopped, that is, the third map information storage area 94 having stored therein the search information 84 of the old version corresponding to the search information 84 of the latest version whose use is started, based on the management information 86. The CPU 41 then initializes the detected third map information storage area 94 having stored therein the search information 84 of the old version (S222).

Subsequently, the CPU 41 updates the management information 86 in relation to the initialized third map information storage area 94. Specifically, the CPU 41 stores, in association with the initialized third map information storage area 94, data indicating that no map information has been stored therein, the date of update and the like in the management information storage area 97 as the management information 86 (S223).

Figure 26:
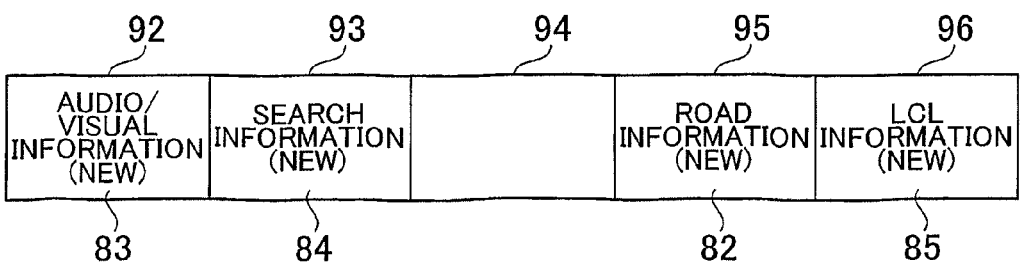
FIG. 26 schematically shows a state where overwriting of LCL information of the latest version in the LCL information storage area is completed and use of the LCL information of the latest version is started.

As shown in FIG. 26, the CPU 41 then stops use of the LCL information 85. The CPU 41 then reads, from the CD-ROM 6, the LCL information 85 of the latest version and overwrites the LCL information storage area 96 with it. The CPU 41 then updates the LCL information 85 to the latest version, and thereafter starts use of the LCL information 85. Subsequently, the CPU 41 stores, in association with the LCL information storage area 96, the version, date of update and the like of the LCL information 85 in the management information storage area 97 as the management information 86, and thereafter ends the map information updating process 3.

Effects of Third Embodiment

As detailed in the foregoing description, with the navigation apparatus 80 of the third embodiment, when an update instruction to update the road information 82, the audio/visual information 83, the search information 84, and the LCL information 85 is inputted, the CPU 41 initializes the map information storage area having stored therein no map information, out of the map information storage areas 92 to 95. The CPU 41 then reads, from the CD-ROM 6, the road information 82, given the first update priority, of the latest version, and stores it in the initialized map information storage area in its entirety. This avoids file fragmentation and the like, which may otherwise occur, when updating the road information 82.

Further, the CPU 41 stores the road information 82 of the latest version and thereafter updates the management information 86. This enables the CPU 41 to store the road information 82 of the latest version and to automatically switch to place the road information 82 of the latest version into use during operations of the navigation apparatus 80.

Further, during operations of the navigation apparatus 80, after switching to the road information 82, given the first update priority, of the latest version, the CPU 41 initializes the map information storage areas in turn in order of priority, starting from the map information storage area having stored therein the road information 82 of the old version, based on the updated management information 86. The CPU 41 then reads, from the CD-ROM 6, the pieces of map information of the latest version respectively corresponding to the pieces of map information prioritized next highest to the road information 82, the audio/visual information 83, and the search information 84 of the old version that had been stored in the initialized map information storage areas, and stores them in the initialized map information storage areas. Further, the CPU 41 updates the management information 86 every time the audio/visual information 83 and the search information 84 of the latest version are stored in the initialized map information storage areas.

In this manner, file fragmentation and the like, which may otherwise occur, when updating the audio/visual information 83 and the search information 84 can be avoided. Additionally, this enables the CPU 41 to store the audio/visual information 83 and the search information 84 of the latest version in turn in order of priority, and to automatically switch to place in turn the updated audio/visual information 83 and the search information 84 of the latest version into use during operations of the navigation apparatus 80.

Further, the CPU 41 initializes the map information storage area having stored therein the search information 84 of the old version that is given the lowest update priority, and thereafter updates the management information 86. This enables the CPU 41 to always select one map information storage area having stored therein no map information, based on the management information 86. Still further, when storing of the road information 82 of the latest version or the like in any initialized map information storage area is aborted midway through the procedure, the map information storage area having stored therein the map information corresponding to the road information 82 of the latest version or the like is not initialized, and the management information 86 remains. This enables the CPU 41 to use the not-updated road information 82 or the like of the old version based on the management information 86.

Further, by designing the first map information storage area 92, the second map information storage area 93, the third map information storage area 94, and the fourth map information storage area 95 to have substantially equivalent storage capacities, the road information 82, the audio/visual information 83, and the search information 84 of the latest version recorded on the CD-ROM 6 can each surely be stored in any one of the map information storage areas 92 to 95 in its entirety.

It is understood that the present invention is not limited to the first to the third embodiments, and that various improvements and modifications can be made without departing from the principles of the present invention.

(A) For example, in the first embodiment, the CD-ROM 6 may have stored therein three or more types of navigation map information obtained by separating broad area map information, such as a nationwide map of Japan or the United States, or a West European map, of the latest version, for use in drive guidance or route finding with the navigation apparatus 1, along the boundaries of administrative districts (for example, along prefectural, state, or national boundaries) so as to be three or more map coverage areas containing substantially equivalent amounts of information, i.e., data amounts. The map information DB storage area 51 of the data recording section 12 may be provided with navigation map information storage areas, which are designed to have substantially equivalent storage capacities, as many as the separated pieces of broad area map information.

In this case, when an update instruction to update the pieces of navigation map information is inputted, the CPU 41 initializes any navigation map information storage area having stored therein no map information currently in use out of the navigation map information storage areas. The CPU 41 then reads, from the CD-ROM 6 via the reading section 18, the navigation map information of the latest version corresponding to the map coverage area containing the map information currently in use, and stores it in the initialized storage area.

The CPU 41 may then update the management information 28, start use of the newly stored map information, and successively initialize the remaining navigation map information storage areas. The CPU 41 may then successively read, from the CD-ROM 6 via the reading section 18, pieces of yet-to-be read navigation map information of the latest version, store them in the initialized remaining navigation map information storage areas, and update the management information 28.

In this manner, the CPU 41 initializes the navigation map information storage areas, and thereafter stores whole pieces of navigation map information of the latest version in the initialized navigation map information storage areas. This avoids file fragmentation and the like, which may otherwise occur, when storing the pieces of navigation map information of the latest version in the navigation map information storage areas. Further, the CPU 41 can store the update map information of the latest version and can automatically switch to the update map information for use during operations of the navigation apparatus 1.

(B) Further, for example, in the first or the second embodiment, the boundary portion between the "A" navigation map information 26 and the "B" navigation map information 27 may be set to include, as to each one of the "A" navigation map information 26 and the "B" navigation map information 27, a prescribed range (e.g., about 10 km) outside the boundary of administrative districts (for example, a prefectural, state, or national boundary). In this manner, even when the host vehicle location is close to the boundary, the surrounding map in connection with the host vehicle location can smoothly be displayed on the liquid crystal display 15, and route finding can be carried out more accurately.

In this case, the CPU 41 executes a determination processing of determining whether or not the administrative district (for example, a prefecture, a state, or a nation) where the host vehicle is located falls within the map coverage area of the map information stored in the first navigation map information storage area 52.

(C) Still further, for example, in the second embodiment, the CD-ROM 6 may have stored therein three or more types of navigation map information obtained by separating broad area map information, such as a nationwide map of Japan or the United States, or a West European map, of the latest version, for use in drive guidance or route finding with the navigation apparatus 1, along the boundaries of administrative districts (for example, along prefectural, state, or national boundaries) so as to be three or more map coverage areas containing substantially equivalent amounts of information, i.e., data amounts. The map information DB storage area 71 of the data recording section 12 may be provided with navigation map information storage areas, which are designed to have substantially equivalent storage capacities, as many as the separated pieces of broad area map information plus "one".

In this case, when an update instruction to update the pieces of navigation map information is inputted, the CPU 41 initializes a navigation map information storage area having stored therein no navigation map information out of the navigation map information storage areas. The CPU 41 then reads, from the CD-ROM 6 via the reading section 18, the navigation map information of the latest version corresponding to the map coverage area containing the map information currently in use, and stores it in the initialized navigation map information storage area.

The CPU 41 may then update the management information 28, start use of the newly stored map information, and successively initialize the remaining navigation map information storage areas. The CPU 41 may then successively read, from the CD-ROM 6 via the reading section 18, pieces of yet-to-be read navigation map information of the latest version, store them in the initialized remaining navigation map information storage areas, and update the management information 28. The CPU 41 may then initialize the last navigation map information storage area, and thereafter update the management information 28.

In this manner, the CPU 41 initializes the navigation map information storage area having stored therein no map information out of the navigation map information storage areas, and stores the navigation map information of the latest version corresponding to the navigation map information currently in use. This avoids file fragmentation and the like. Further, the CPU 41 updates the management information 28 and then starts use of the newly stored navigation map information of the latest version. This enables the CPU 41 to update the navigation map information currently in use to the latest version and to automatically switch to place the updated information into use during operations of the navigation apparatus 70.

Further, the CPU 41 can store the update map information of the latest version and automatically switch to place the update map information into use during operations of the navigation apparatus 70. Still further, the CPU 41 updates the management information 28, then initializes the navigation map information storage area having stored therein the navigation map information of the old version, and thereafter again updates the management information 28. This enables the CPU 41 to always select one navigation map information storage area having stored therein no map information, that is, a free storage area, based on the management information 28.

If storing of the navigation map information of the latest version in the initialized navigation map information storage area out of the navigation map information storage areas is aborted midway through the procedure, the navigation map information storage area having stored therein the navigation map information of the old version corresponding to the navigation map information of the latest version is not initialized, and the management information 28 remains. This enables the CPU 41 to use the entire map information based on the management information 28.

(D) Further, for example, in the second embodiment, in S114, the CPU 41 may read, from the CD-ROM 6, the navigation map information of the latest version corresponding to the navigation map information not currently in use, and store it in the initialized navigation map information storage area. In this case, in S117, the CPU 41 may read from the CD-ROM 6 the navigation map information of the latest version corresponding to the navigation map information currently in use, and store it in the initialized navigation map information storage area. In S118, the CPU 41 may stop use of the navigation map information currently in use, and start use of the navigation map information of the latest version.

In this manner, the CPU 41 updates the management information 28 and then starts use of the newly stored navigation map information of the latest version. This enables the CPU 41 to update the navigation map information currently in use to the latest version and to automatically switch to place the updated information into use during operations of the navigation apparatus 70. Further, the CPU 41 updates the management information 28, then initializes the navigation map information storage area having stored therein the "A" navigation map information 26 or the "B" navigation map information 27 of the old version, and thereafter again updates the management information 28. This enables the CPU 41 to always select one navigation map information storage area having stored therein no map information, that is, a free storage area, based on the management information 28.

If storing of the navigation map information of the latest version in the initialized navigation map information storage area out of the navigation map information storage areas 72 to 74 is aborted midway through the procedure, the navigation map information storage area having stored therein the navigation map information of the old version corresponding to the navigation map information of the latest version is not initialized, and the management information 28 remains. This enables the CPU 41 to use the entire map information based on the management information 28.

(E) Further, for example, in the third embodiment, the LCL information storage area 96 may not be provided. In this case, the road information 82, the audio/visual information 83, the search information 84 and the LCL information 85 may have been stored in any of the first to the fourth map information storage areas 92 to 95. In S212, the CPU 41 may stop use of the LCL information 85, and read, from the management information 86, the map information storage area having stored therein the LCL information 85.

Subsequently, in S213, the CPU 41 may initialize the map information storage area having stored therein the LCL information 85. Subsequently, the CPU 41 may execute the processes in S214 to S222, thereafter read, from the CD-ROM 6, the LCL information 85 of the latest version in S223, and store it in the initialized map information storage area. The CPU 41 may then update the management information 86 in relation to the map information storage area having just stored therein the LCL information 85 of the latest version, and thereafter end the map information updating process 3.

Specifically, the CPU 41 may store, in association with the map information storage area having just stored therein the information 85, the version, date of update and the like of the LCL information 85 in the management information storage area 97 as the management information 86, and thereafter end the map information updating process 3.

Thus, in addition to the effects of the third embodiment, elimination of the LCL information storage area 96 from the map information DB storage area 91 can be achieved, thereby contributing to reduction in storage capacity of the data recording section 12.

(F) Further, for example, in the second embodiment, the map information DB storage area 71 may be designed to include four or more of navigation map information storage areas. Further, it is preferable that storage capacities of the four or more of navigation map information storage areas are designed to have substantially equivalent storage capacities, each being large enough to store the entire data of one of the "A" navigation map information 26 and the "B" navigation map information 27 read from the CD-ROM 6.

Further, the management information 28 related to the navigation map information 26 and 27 (for example, the navigation map information storage areas having stored therein the navigation map information 26 and 27, map coverage areas, versions, dates of update, and the like of the navigation map information 26 and 27) may be designed to be stored in the management information storage area 75.

Thereby, in S112, the CPU 41 is surely capable of acquiring a navigation map information storage area having stored therein none of the navigation map information 26 and 27 among from the four or more of the navigation map information storage areas in the RAM 42 as one navigation map information storage area having stored therein no map information currently.

(G) Further, for example, in the third embodiment, the map information DB storage area 91 may be designed to include five or more of navigation map information storage areas. Further, it is preferable that storage capacities of the five or more of navigation map information storage areas are designed to have substantially equivalent storage capacities, each being large enough to store the entire data of one of the road information 82, the audio/visual information 83 and the search information 84 of the latest version read from the CD-ROM 6.

Further, the management information 86 related to the road information 82, the audio/visual information 83 and the search information 84 (for example, the map information storage areas having stored therein the information 82 through 85, versions, dates of update, and the like of the information 82 through 85) may be designed to be stored in the management information storage area 97.

Thereby, in S212, the CPU 41 is surely capable of acquiring a map information storage area having stored therein none of the road information 82, the audio/visual information 83 and the search information 84 among from the five or more of the map information storage areas in the RAM 42 as one map information storage area having stored therein no map information currently.

The invention claimed is:

1. A navigation apparatus, characterized by comprising:
a map information storing unit that stores pieces of map information about a plurality of map coverage areas respectively in any of a plurality of storage areas including a first storage area and a second storage area, and that stores management information of the map coverage areas related to the pieces of map information stored in the storage areas;
a map coverage area detecting unit that detects a map coverage area containing a piece of such map information currently in use out of the plurality of map coverage areas;
a storage area selecting unit that selects the first storage area having stored a piece of map information of a map coverage area geographically distinct from the map coverage area detected by the map coverage area detecting unit, based on the management information;
an update map information acquiring unit that acquires pieces of update map information of the map coverage areas from a recording medium having recorded thereon the pieces of update map information; and
an update control unit that exerts control so as to initialize the first storage area, thereafter to acquire a piece of such update map information of the map coverage area detected by the map coverage area detecting unit through the update map information acquiring unit and to store the piece of update map information in the first storage area, and thereafter to update the management information, thereafter further to initialize the second storage area having stored therein a piece of map information of a map coverage area identical with the piece of the map information of the map coverage area stored in the first storage area, thereafter to acquire a piece of such update map information of a map coverage area other than the piece of update map information stored in the first storage area through the update map information acquiring unit and to store the piece of update map information in the second storage area, and thereafter to update the management information.

2. The navigation apparatus according to claim 1, wherein the pieces of map information are separated into two map coverage areas having substantially equivalent information amounts.

3. A map information updating method, characterized by comprising:
detecting a map coverage area containing a piece of map information currently in use out of a plurality of map coverage areas;
selecting a first storage area having stored therein a piece of map information of the map coverage area geographically distinct from the map coverage area detected in the detecting of the map coverage area out of a plurality of storage areas including the first storage area and a second storage area for storing therein pieces of such map information of the map coverage areas based on management information of the map coverage areas related to the pieces of map information stored in the storage areas; and
exerting update control so as to initialize the first storage area selected in the selecting of the first storage area, thereafter to acquire a piece of update map information of the map coverage area detected in the detecting of the map coverage area from a recording medium having recorded thereon pieces of such update map information and to store the piece of update map information in the first storage area, and thereafter to update the management information, thereafter further to initialize the second storage area having stored therein map information of the map coverage area detected in the detecting of the map coverage area, thereafter to acquire a piece of such update map information of a map coverage area other than the piece of update map information stored in the first storage area from the recording medium and to store the piece of update map information in the second storage area, and thereafter to update the management information.

4. The map information updating method according to claim 3, wherein the pieces of map information are separated into two map coverage areas having substantially equivalent information amounts.

5. A navigation apparatus, characterized by comprising:
a map information storing unit that stores a plurality of pieces of map information about each of a plurality of map coverage areas in any of a plurality of storage areas being more than the number of the plurality of pieces of map information, and that stores management information related to the pieces of map information stored in the storage areas;
a free storage area selecting unit that selects one free storage area having stored therein map information geographically distinct from one of the pieces of map information out of the plurality of storage areas, based on the management information;
an initializing unit that initializes the free storage area selected by the free storage area selecting unit;
a priority order storing unit that stores priority order previously given to the plurality of pieces of map information about each of the plurality of map coverage areas;
a map coverage area detecting unit that detects a map coverage area containing a piece of such map information currently in use out of the plurality of map coverage areas;
a reprioritizing unit that reprioritizes to give the first of the priority order to the piece of map information of the map coverage area detected by the map coverage area detecting unit, and that reprioritizes the remaining pieces of such map information based on the priority order stored in the priority order storing unit;
a free storage area update control unit that exerts control so as to acquire a piece of update map information corresponding to a piece of such map information that is given first of the priority order reprioritized by the reprioritizing unit from a recording medium having recorded thereon pieces of such update map information and to store the piece of update map information in the free storage area initialized by the initializing unit, and thereafter to update the management information; and a map information update control unit that exerts control so as to initialize the storage areas in turn according to the priority order from a storage area having stored therein the piece of map information given the first of the priority order reprioritized by the reprioritizing unit based on the updated management information, to acquire pieces of such update map information that respectively correspond to pieces of such map information that are prioritized next highest to the pieces of the map information that had been stored in the initialized storage areas from the recording medium, and to store the acquired pieces of update map information respectively in the initialized storage areas so as to update the management information every time the acquired update map information is stored in the initialized storage areas, thereafter to initialize a storage area having stored therein a piece of such map information given the last of the priority order reprioritized by the reprioritizing unit, and thereafter to update the management information.

6. The navigation apparatus according to claim 5, wherein the plurality of map coverage areas are separated so that the plurality of pieces of map information have substantially equivalent information amounts.

7. The navigation apparatus according to claim 5, wherein
the plurality of pieces of map information are respectively about a plurality of types of data, and
the plurality of types of data include road information related to a link and a node, audio/visual information related to route guidance, and search information for finding a route to a destination or for searching for a geographical point.

8. A map information updating method, characterized by comprising:
selecting, based on management information related to a plurality of pieces of map information about each of a plurality of map coverage area having been respectively stored in a plurality of storage areas being more than the number of the pieces of map information, one free storage area having stored therein a piece of map information of the map coverage area geographically distinct from the map coverage area of the pieces of map information out of the plurality of storage areas;
initializing the free storage area selected in the selecting of the free storage area;
detecting a map coverage area containing a piece of map information currently in use out of the plurality of map coverage areas;
a reprioritizing to give the first of the priority order to the piece of map information of the map coverage area detected in the detecting of the map coverage area, and reprioritizing the remaining pieces of such map information based on the priority order previously assigned to the plurality of pieces of map information about each of the plurality of map coverage areas;
exerting free storage area update control so as to acquire, from a recording medium having recorded thereon, pieces of update map information and based on priority order previously given to the pieces of map information, a piece of such update map information corresponding to a piece of such map information given first of the priority order reprioritized in the reprioritizing and to store the piece of update map information in the free storage area initialized in the initializing of the free storage area, and thereafter to update the management information; and exerting map information update control so as to initialize the storage areas in turn according to the priority order from a storage area having stored therein the piece of map information given the first of the priority order reprioritized in the reprioritizing based on the management information updated in the exerting of the free storage area update control, to acquire pieces of such update map information that respectively correspond to pieces of such map information that are prioritized next highest to the pieces of the map information that had been stored in the initialized storage areas from the recording medium, and to store the acquired pieces of update map information respectively in the initialized storage areas so as to update the management information every time the acquired update map information is stored in the initialized storage areas, thereafter to initialize a storage area having stored therein a piece of such map information given the last of the priority order reprioritized in the reprioritizing, and thereafter to update the management information.

9. The navigation apparatus according to claim 1 further comprising a vehicle location detecting unit that detects location of a vehicle,
wherein the map coverage area detecting unit detects a map coverage area including the location of the vehicle out of the plurality of map coverage areas as the map coverage area containing the piece of such map information currently in use.

10. The navigation apparatus according to claim 9, wherein the update control unit exerts control so as to initialize the first storage area, thereafter to acquire a piece of such update map information of the map coverage area detected by the map coverage area detecting unit through the update map information acquiring unit and to store the piece of update map information in the first storage area, thereafter to update the management information, and thereafter to stop using the piece of such map information currently in use, and to start using the piece of update map information stored in the first storage area.

11. The map information updating method according to claim 3 further comprising detecting location of a vehicle,
wherein, in the detecting the map coverage area, a map coverage area including the location of the vehicle is detected out of the plurality of map coverage areas as the map coverage area containing the piece of such map information currently in use.

12. The map information updating method according to claim 11, herein, in the exerting update control, the first storage area selected in the selecting of the first storage area is initialized, thereafter a piece of update map information of the map coverage area detected in the detecting of the map coverage area is acquired from a recording medium having recorded thereon pieces of such update map information and subsequently stored in the first storage area, thereafter the management information is updated, thereafter use of the piece of such map information currently in use is stopped and use of the pieces of update map information stored in the first storage area is started.

* * * * *